(12) United States Patent
Vasquez et al.

(10) Patent No.: US 9,700,178 B2
(45) Date of Patent: Jul. 11, 2017

(54) BRUSH BOWL

(71) Applicants: Rafael Vasquez, San Mateo, CA (US); James Fisher, Walnut Creek, CA (US)

(72) Inventors: Rafael Vasquez, San Mateo, CA (US); James Fisher, Walnut Creek, CA (US)

( * ) Notice: Subject to any disclaimer, the term of this patent is extended or adjusted under 35 U.S.C. 154(b) by 671 days.

(21) Appl. No.: 13/762,480

(22) Filed: Feb. 8, 2013

(65) Prior Publication Data

US 2014/0224277 A1    Aug. 14, 2014

(51) Int. Cl.
*A47J 43/24* (2006.01)
*A23N 15/00* (2006.01)
*A23L 1/00* (2006.01)

(52) U.S. Cl.
CPC .............. *A47J 43/24* (2013.01); *A23L 1/0011* (2013.01); *A23N 15/00* (2013.01)

(58) Field of Classification Search
CPC ......... A47L 13/10; A23N 12/00; A23N 15/00; A63B 47/04; A47J 43/24; A23L 1/0011
See application file for complete search history.

(56) References Cited

U.S. PATENT DOCUMENTS

| | | | | |
|---|---|---|---|---|
| 502,651 A * | 8/1893 | Blockburger | .......... | A22C 17/08 15/21.2 |
| 2,580,981 A | 1/1952 | Webster | | |
| 2,602,945 A * | 7/1952 | Wilde | .................. | A01K 43/005 15/3.1 |
| 2,608,705 A * | 9/1952 | Duff | ........................ | A63B 47/04 15/160 |
| 3,044,089 A * | 7/1962 | Boynton | ................ | A63B 47/04 134/156 |
| 3,949,443 A * | 4/1976 | Edgar | ..................... | A63B 47/04 134/145 |
| 4,756,439 A | 7/1988 | Perock | | |
| 5,577,289 A * | 11/1996 | Russell | ..................... | B32B 3/06 15/114 |
| 7,678,271 B2 | 3/2010 | Curtin | | |
| 2002/0138930 A1* | 10/2002 | Wheeler | ................ | A47K 7/026 15/110 |
| 2003/0204927 A1* | 11/2003 | Kelly | ..................... | A47K 7/026 15/160 |
| 2008/0276389 A1* | 11/2008 | Nishimura | .............. | A23N 15/06 15/3.1 |

* cited by examiner

*Primary Examiner* — Randall Chin
(74) *Attorney, Agent, or Firm* — Lyman Moulton, Esq.

(57) ABSTRACT

Bowls and methods for scrubbing objects are disclosed. The bowls or optionally removable liners in the bowls include a plethora of bristles or mesh material which provides an abrasive surface against which objects can be scrubbed. The bowls may optionally incorporate extendable sections for the purpose of suspending the bowls from the sides of a sink. In one embodiment, a circular version of the bowl may be configured to double as a spinner bowl inside a salad spinner and in other embodiments apertures with abrasive material inside may be provided for scrubbing narrow items such as carrots. Larger industrial-size versions of the bowl may be constructed for use in restaurants, or for the purpose of scrubbing non-food products, such as mechanical parts. The shape, depth and diameter of the bowls as well as the type of abrasive materials used inside these bowls can vary to suit the application.

14 Claims, 25 Drawing Sheets

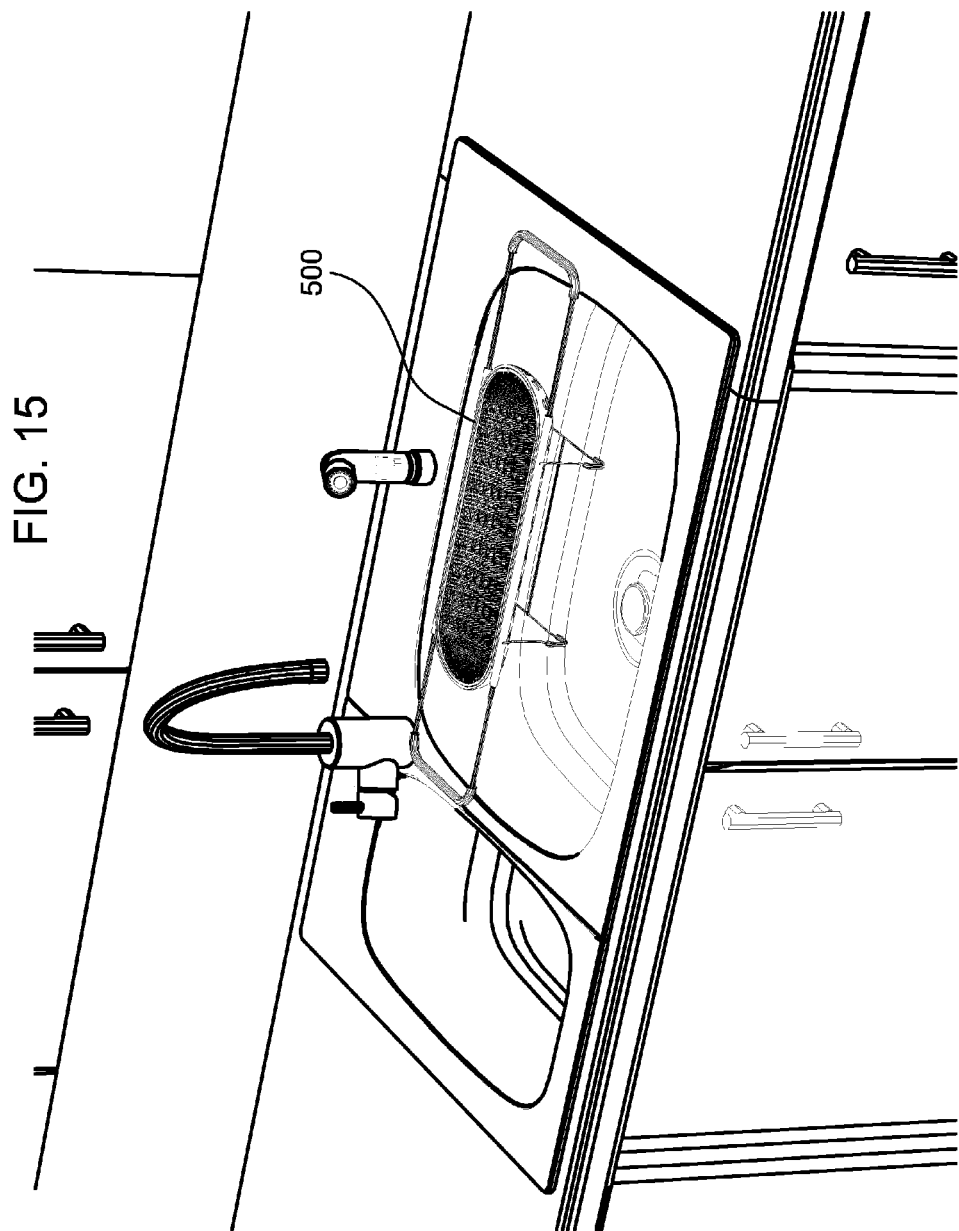

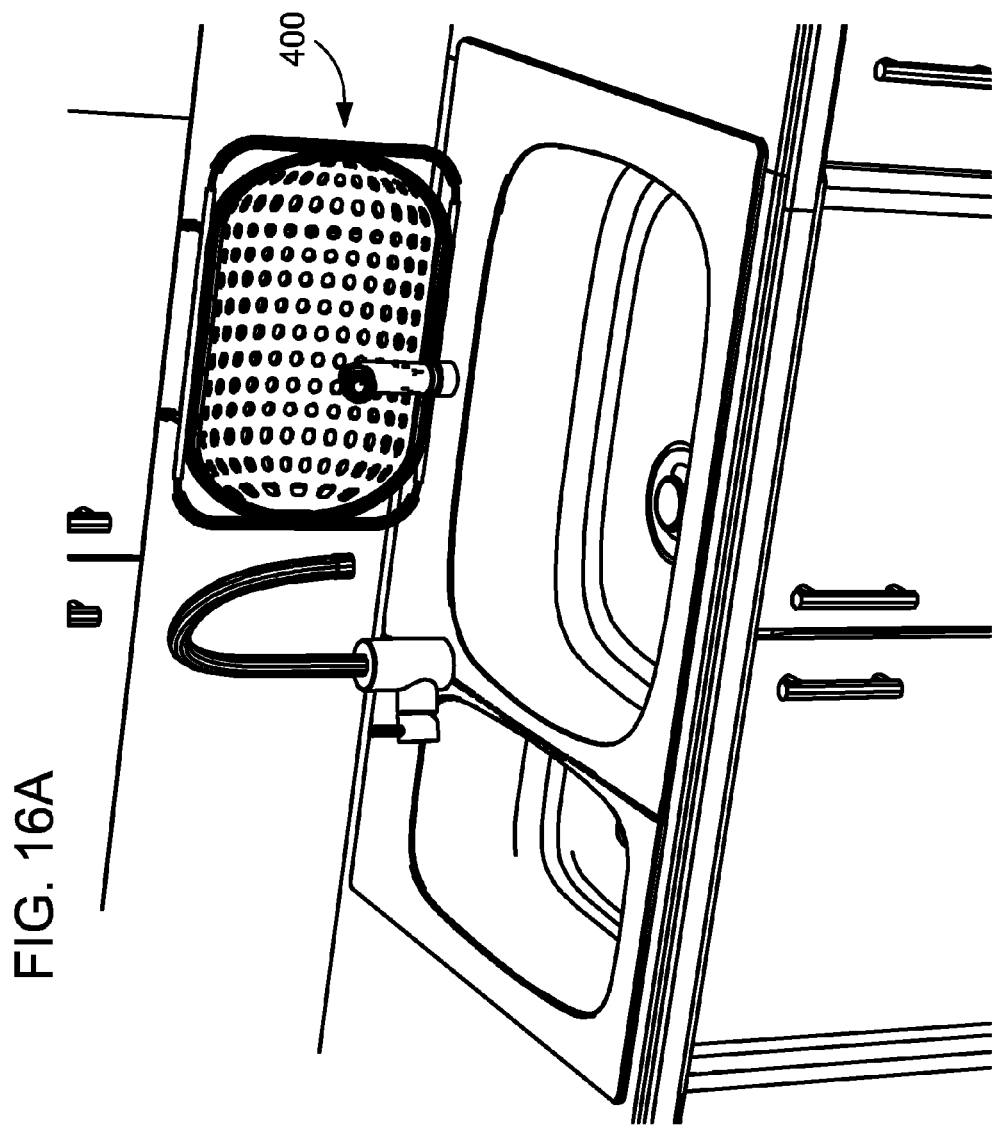
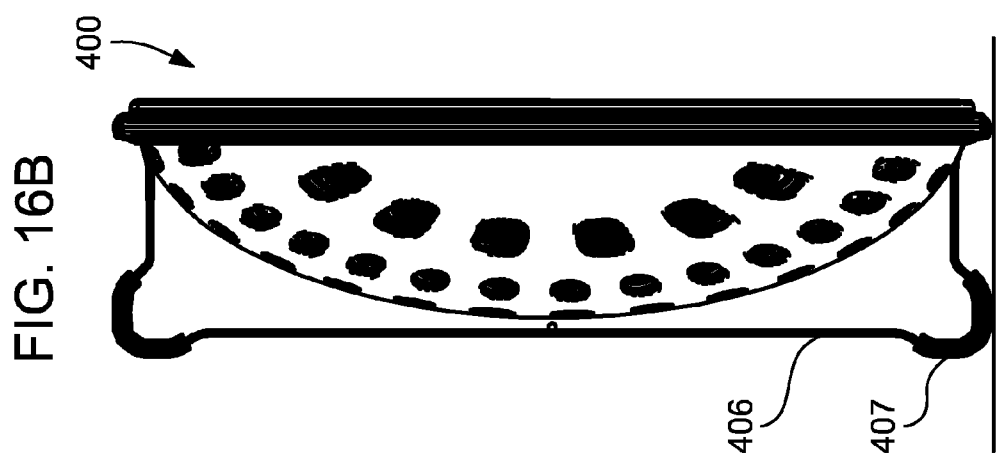

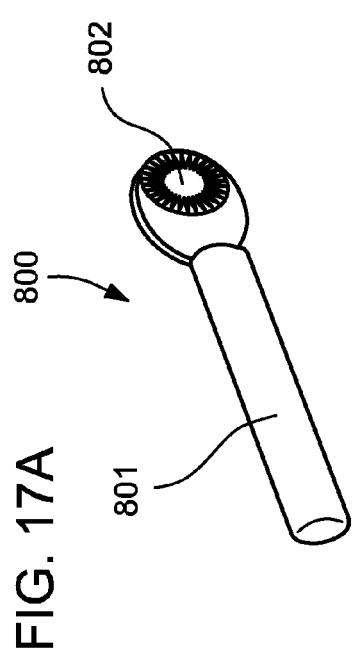

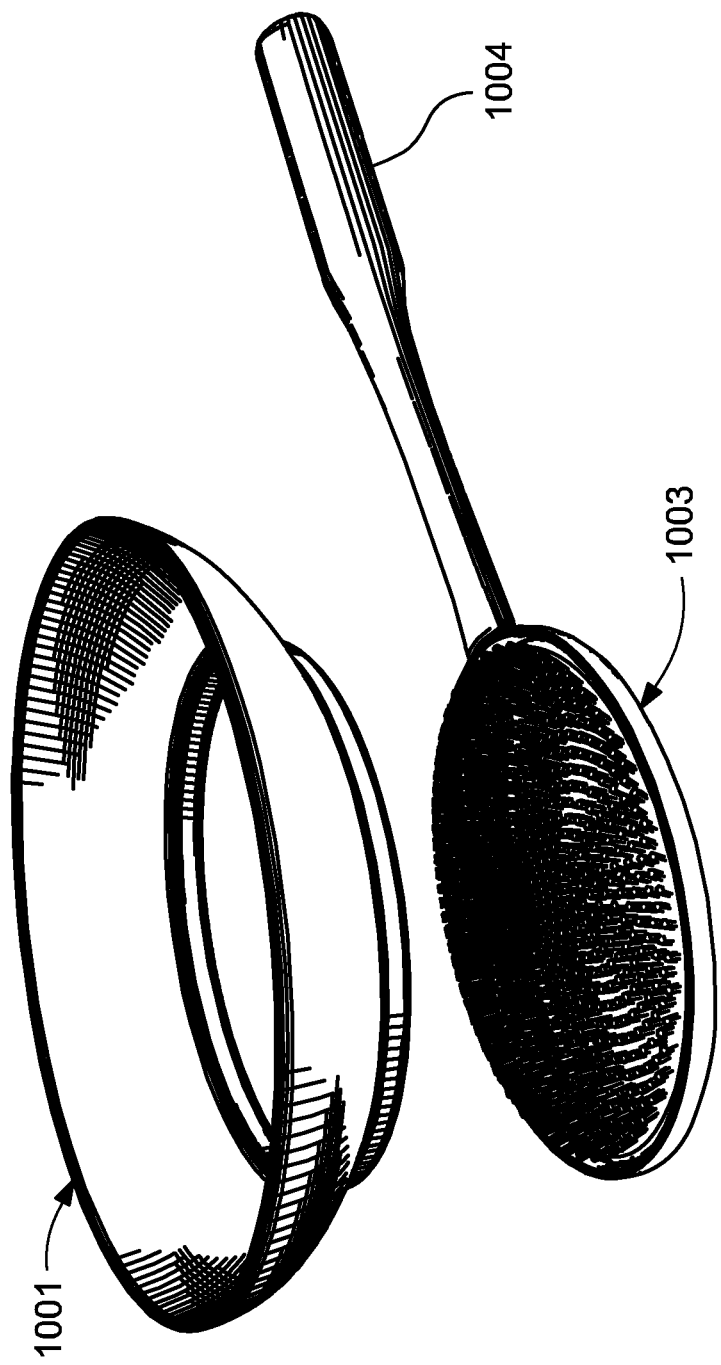

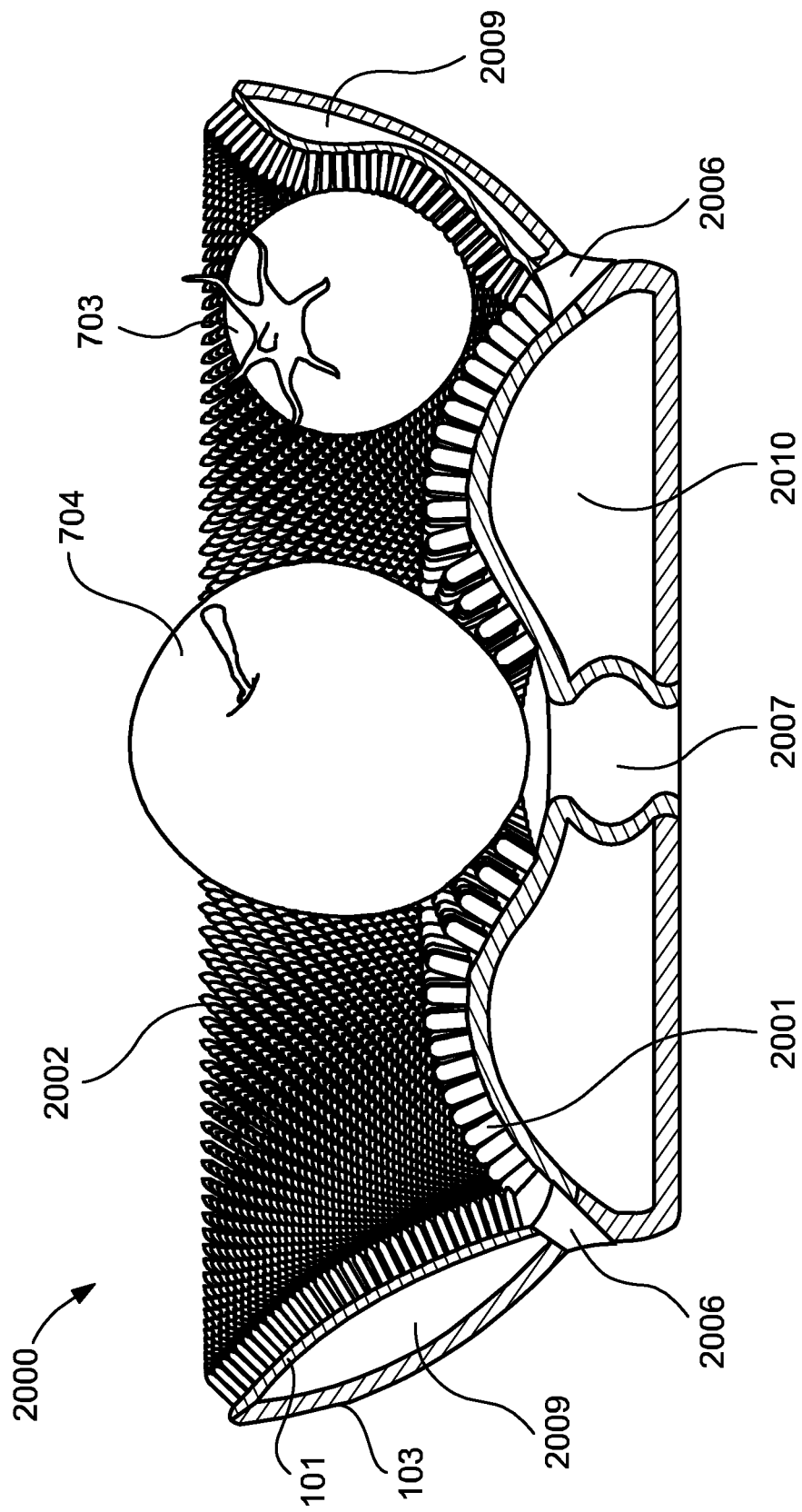

BRUSH BOWL

CROSS-REFERENCE TO RELATED APPLICATION

This application claims the benefit of the priority date of earlier filed U.S. Provisional Patent Application Ser. No. 61/597,712, titled 'Scrubber Bowls with Abrasive Surfaces' filed Feb. 10, 2012 for Rafael Vasquez and James Fisher, incorporated herein by reference in its entirety.

BACKGROUND OF THE INVENTION

The task of manually washing vegetables and fruit prior to consuming them generally involves holding the food produce in one hand under the faucet while the water is flowing and using the other hand to rub all around the exterior of said produce with a scrub brush or abrasive glove or the surface of the hand. During this process, copious amounts of water is typically used and the act of turning the produce and scrubbing all around said produce's surface can easily be incomplete and insufficiently thorough. In addition, manipulating said produce and scrubbing implement is awkward and the produce can be easily dropped into the sink below, or parts of the produce such as individual leaves or grapes, for example, can break off and fall into the sink, where they come into contact with dirt and bacteria or be lost down the drain. Also, the amount of produce that one can wash at any one time is limited to what one can hold in one's hand, and some produce, such as a head of cabbage can be large and difficult for many to hold. The process can be particularly challenging for those who are frail or elderly or only have the use of one hand. With the growing public concern and awareness in recent years over the risk of bacterial infection from contaminated produce, the need for an easy, thorough and effective means of scrubbing fruit and vegetables has become more pronounced.

SUMMARY OF THE INVENTION

Using the system disclosed herein, produce can more easily be scrubbed without risk of dropping the produce and in a manner that is more thorough and more time and water efficient. The disclosed device is comprised of a bowl that is lined on its interior with a surface that is designed to abrade or rub clean the surface of produce or objects that are placed in the bowl and agitated in said bowl. Produce can be held in one or two hands and scrubbed clean against the abrasive surface in the bowl by a variety of movements such as pushing it back and forth while twisting it such that all sides of the produce are gradually turned to contact the scrubbing surface and are thereby scrubbed clean.

A cleaning liner is disclosed comprising a flexible substrate retainable in a supporting structure, the liner configured to define at least one opening for a fluid to pass there through. The liner comprises a plurality of cleaning protrusions extending from a cleaning side of the liner. Each cleaning protrusion has a free end spaced apart from another protrusion and adjacent protrusions are configured to move in conformance to an area of an object depressed against the liner and brush against and clean the area via the movement. A disclosed method of cleaning an object or a food item may additionally comprise pressing the food item against the cleaning liner allowing the cleaning protrusions to move toward a point of depression thereof and toward each other and brush against and clean the object thereby.

A supporting structure for the cleaning liner is configured to retain a food item. The supporting structure may be bowl-like and/or radial and may define at least one opening for a fluid to pass there through.

The abrasive lining of the bowl may be removable and can take various forms. According to some embodiments the lining can be composed of a flexible or rigid backing to which abrasive bristles, fibers, protrusions or mesh material ("BRISTLES") are affixed or can emanate directly therefrom and comprise a similar durometer material. Said bristles may be randomly or evenly dispersed across the interior surface of the lining or they may be arranged in intermittent clusters or in patterns according to some embodiments. Optionally, the interior or concave surface of the lining may be characterized by a series of ridges or bumps or nubs or a combination of these in any of a variety of different placement patterns. Optionally, the lining may be composed of an abrasive mesh material which may also be porous.

The abrasive lining may have holes or pores through it according to some embodiments to allow water and air to flow or egress through the lining in reaction to the object pressed into the liner or otherwise. Said holes or pores may be evenly distributed around the surface of the lining or in any of a variety of different patterns. The diameter of said holes or pores may vary to suit different applications. For example, narrow produce such as legumes may require the use of very small holes or pores. The size and density of said pores or holes can also be varied to effect the rate of drainage of water from the bowl. Bowls may also be produced with no holes or pores or with a single hole that can be plugged or its aperture size varied, according to some embodiments. The bristles may be distributed over the interior surface of the lining in a pattern that complements the arrangement of the holes, such that the holes can be seen between the clusters of bristles. The bowl into which the lining fits or is affixed may also have a series of holes to allow water to flow through to the sink below, or according to some embodiments the exterior surface of the bowl may be sealed and the bowl can incorporate a volume or compartment below the underside of the lining for the purpose of collecting water. A sealed bowl can optionally be filled or partially filled with water such that the water level is high enough to partially or fully immerse produce while scrubbing said produce. Such a sealed bowl can be used without the need for a sink beneath and can be held in one hand or placed on a kitchen counter while scrubbing.

In an embodiment of the disclosure, a gas such as air may be circulated around and between food items retained in the brush bowl from one hole or pore to another in order to dry and otherwise dehydrate the food item.

The abrasive lining can be composed of dishwasher-safe materials to allow for easy automatic cleaning in a dishwasher. According to some embodiments the lining may be flexible such that it can be inverted and held upside down under flowing water in order to wash out any trapped particulates.

The lining and optionally the bowl may be collapsible or compressible such that they can be stored in a compact space, according to some embodiments. According to some embodiments the bowl can have the abrasive material and/or protrusions directly affixed to its interior that is not removable. Said bowl may be composed of rigid or flexible material or a combination of both.

According to some embodiments the bowl may be small enough to fit in one hand or have structures such as a handle that make it easier for one to hold it with one hand, while the other hand is used to hold and scrub the produce inside the bowl. As viewed from above, the bowl and its abrasive liner can have any of a variety of shapes, including but not limited to an oval, circle, or a rounded rectangle including an oblong shape, and any other common bowl shape for example.

The bowl may be produced in various sizes and may be produced for other purposes and industries, such as for cleaning grease and dirt off mechanical parts. According to some embodiments the bowl may have extendable arms or handles that can be drawn out sufficiently far such that the bowl can be suspended in a sink and supported by said arms which would rest on the upper rim of the sink. Such a configuration can free the user from having to hold the bowl with one hand and allows the user to employ both hands in holding and scrubbing produce, as desired. It also helps to position the bowl underneath the faucet and keeps it stable.

According to some embodiments, the bowl may also double as a salad spinner so that the dual functions of scrubbing produce and spinning out excess water are provided in one product. In such an embodiment the abrasive liner would fit into the internal spinner bowl. This allows the user to use the bowl to clean produce and once complete, lifting the internal spinner bowl out of the exterior bowl and then draining the accumulated water out of the exterior bowl into the sink. The spinner bowl is then reinserted into the empty exterior bowl and used for spinning salad. The abrasive liner can optionally be removed or left in place since it has holes to allow water to pass through it.

The bowl may have feet so that it can be securely placed on a surface while the underside of the bowl is raised above said surface, according to some embodiments. Said feet may be optionally configured to also face outward such that the bowl can be stored on its side while partially or fully resting on the feet along one edge.

The bowl may optionally have a ring-shaped structure attached to or integrated with it, according to some embodiments. Said ring would be designed for the purpose of scrubbing relatively long and narrow items such as carrots and celery sticks. Said ring would be characterized by inward-facing bristles distributed around the inside surface of the ring and could be positioned adjacent to and integral with the brush bowl and oriented to make it easy for the user to hold carrots or celery while scrubbing them backward and forward through said ring. Said ring could be removable and may have a handle attached so that it can be held independently of the bowl for ease of use or it may dock with the bowl such that it can be used while attached to the bowl, according to some embodiments. Said ring could optionally be attached to the bowl such that it can articulate into position over the bowl so that the bowl can act as a catcher below the ring in the case the user drops the carrot or celery stick while scrubbing it.

Other aspects and advantages of embodiments of the disclosure will become apparent from the following detailed description, taken in conjunction with the accompanying drawings, illustrated by way of example of the principles of the disclosure.

BRIEF DESCRIPTION OF THE DRAWINGS

FIG. 15 depicts a perspective view of a narrow version of the brush bowl with extendable support arms in place over the sink according to an embodiment of the disclosure.

FIG. 16A depicts a kitchen sink in which the scrubbing bowl with extendable arms has been stored on its side behind the sink against the wall, with its arms retracted according to an embodiment of the disclosure.

FIG. 16B depicts a side view in which the scrubbing bowl has been stood on its side, demonstrating its ability to be easily stored in a compact manner and out of the way according to an embodiment of the disclosure.

FIG. 17A depicts a perspective view of a carrot and celery scrubber hand tool which has a ring-shaped orifice incorporating inward-facing bristles or abrasive mesh, through which relatively narrow and long items such as carrots and celery may be scrubbed back and forth according to an embodiment of the disclosure.

FIG. 17B depicts a perspective view of the underside of a scrubbing bowl, in which the detachable carrot and celery scrubber hand tool has been docked with the bowl for convenient storage as well as hands-free use according to an embodiment of the disclosure.

FIG. 21 depicts an embodiment of the brush bowl, in which an abrasive bottom with a handle is separated from the upper section of the bowl and may be used independently as a hand-held scrubbing brush in accordance with an embodiment of the disclosure.

FIG. 23B is a cross-sectional depiction of a brush bowl where various bristles move toward objects (depicted in solid) depressed against the liner and clean the objects via the movement in accordance with an embodiment of the present disclosure.

Figure 1A:
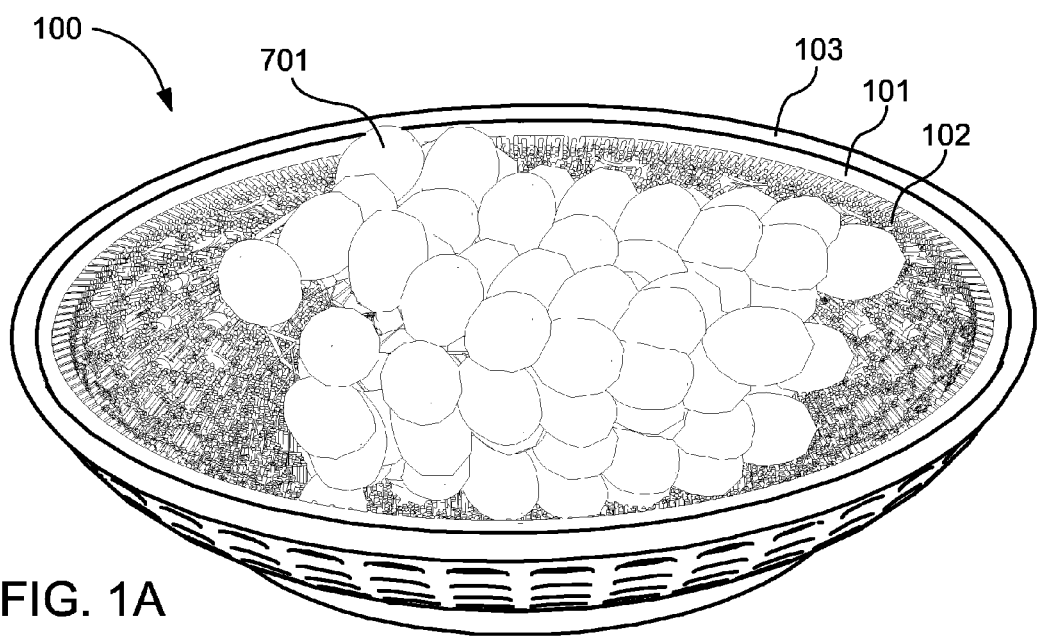
FIG. 1A illustrates a perspective view of an approximately circular shaped brush bowl designed for scrubbing fruits and vegetables according to an embodiment of the disclosure.

Throughout the description, similar or same reference numbers may be used to identify similar or same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

As used throughout the present disclosure, the term 'bowl' may refer to a brush bowl, a scrubbing bowl and simply a bowl as disclosed herein. Also, the term 'brush' may refer to bristles, fibers, finger-like protrusions or mesh material which may be directly affixed to the brush bowl or may emanate from a substrate or liner thereof.

FIG. 1A illustrates a perspective view of an approximately circular shaped brush bowl 100 designed for scrubbing fruit and vegetables, according to an embodiment of the disclosure. Said bowl may be scaled to any size for use in the cleaning of various items and quantities of items. For example, a large industrial-size bowl, such as may be used in a restaurant or canteen for immersing and scrubbing large quantities of vegetables and fruit may be produced. Said bowl may take a variety of shapes and forms, the common attributes being the abrasive material or bristles on its inside surface. The depicted bowl is small enough to be held in one hand over a kitchen sink while items such as the depicted grapes 701 or cherries 702 can be scrubbed in the brush bowl 100 with the other hand, without the usual risk of individual grapes or cherries dropping the into the sink below. By rolling and pushing the fruit or vegetables around in the brush bowl 100 while water is pouring over them from the sink faucet, one is able to more effectively, easily and securely clean off dirt, pathogens and pesticide residue than using traditional methods, and without food being wasted as a result of it dropping into the sink or falling down the drain. In the depicted embodiment the inward-facing bristled material 102 or other abrasive material is integrated into an optionally removable liner 101, according to some embodiments. In other embodiments, the bristled or abrasive material may not be separable from the outer bowl 103 supporting structure but rather emanate therefrom. Said outer bowl 103 provides structural support for the bowl liner 101.

Figure 1B:
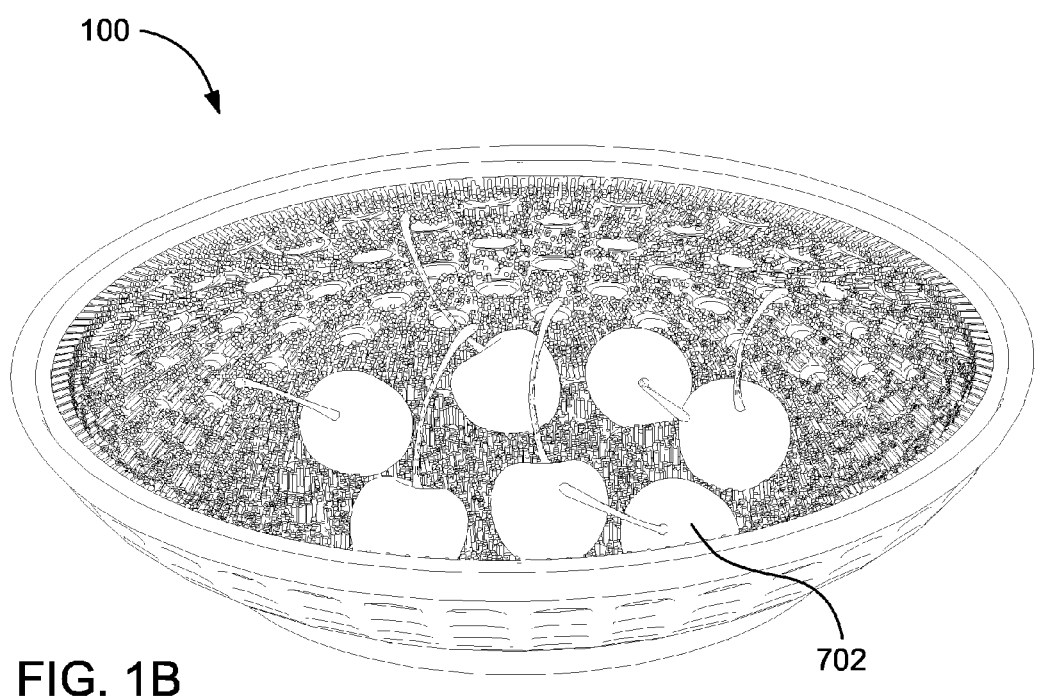
FIG. 1B illustrates another perspective view of the approximately circular shaped brush bowl designed for scrubbing fruits and vegetables according to an embodiment of the disclosure.

FIG. 1B illustrates a perspective view of an approximately circular shaped brush bowl 100 designed for scrubbing fruit and vegetables, according to an embodiment of the disclosure. Reference numbers similar to or the same as reference numbers in other drawings may identify similar or same elements described immediately herein and in other supporting descriptions. The bowl may be produced in various sizes, including small hand-held bowls as well as large versions for industrial uses, such in a restaurant or canteen for immersing and scrubbing large quantities of vegetables and fruit, or for use in a non-food-related application such as the cleaning of grease and dirt off mechanical parts in a vehicle repair operation. Bowls may take a variety of shapes and sizes, depending on the needs of each operation, wide and deep bowls as well as more box-shaped bowls designed to fit into a large rectangular sink, and approximately conform to the shape of said sink so that said box-shaped bowl is stable and able to catch all produce that is thrown into it, without any gaps between the perimeter of said bowl and said sink into which produce otherwise might fall.

Figure 2A:
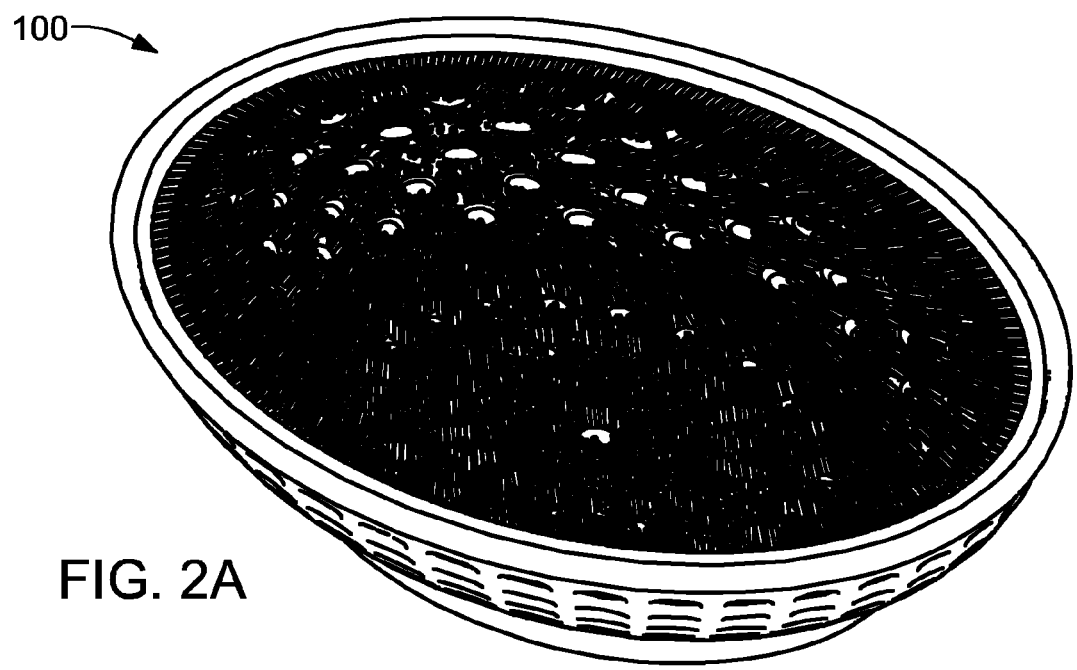
FIG. 2A depicts a perspective view of an oval-shaped brush bowl (as seen from above), according to an embodiment of the disclosure.

FIG. 2A depicts a perspective view of an oval-shaped brush bowl 100 (as seen from above), according to an embodiment of the disclosure. Reference numbers similar to or the same as reference numbers in other drawings identify similar or same elements described immediately herein and in other supporting descriptions.

Figure 2B:
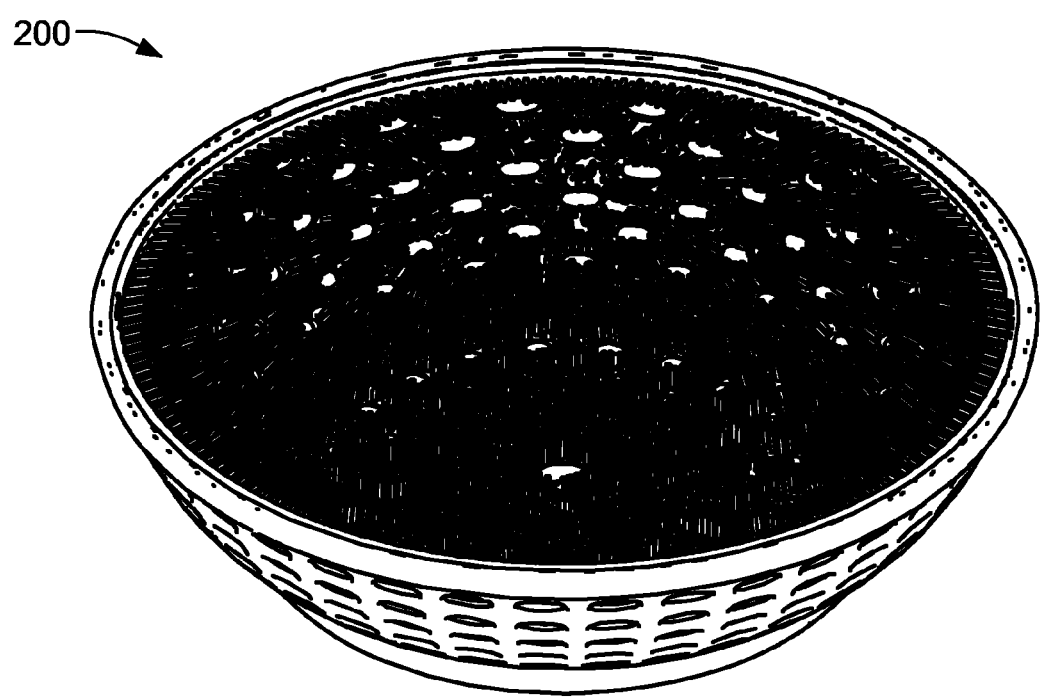
FIG. 2B depicts a perspective view of a circular-shaped brush bowl (as seen from above), according to an embodiment of the disclosure.

FIG. 2B depicts a perspective view of a circular-shaped brush bowl 200 (as seen from above), according to an embodiment of the disclosure. The bowl shape may vary and can take shapes other than those depicted here. Reference numbers similar to or the same as reference numbers in other drawings identify similar or same elements described immediately herein and in other supporting descriptions.

Figure 3A:
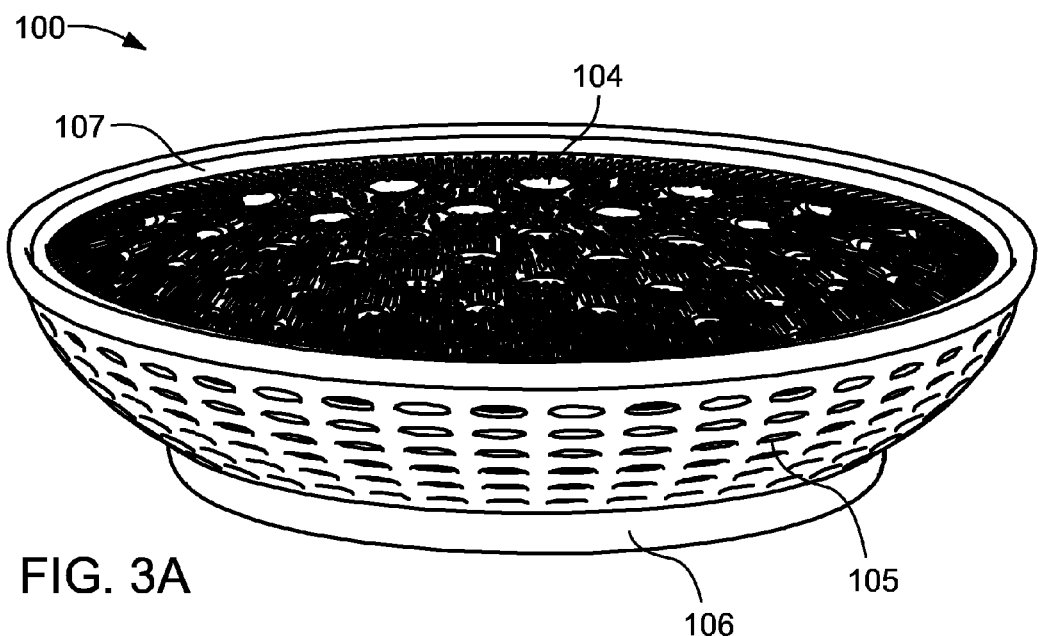
FIG. 3A depicts a perspective view of the oval-shaped brush bowl such that one can see the exterior holes in the bowl which are distributed around the sides and underside of the bowl, according to an embodiment of the disclosure.

FIG. 3A depicts a perspective view of the oval-shaped brush bowl 100, such that one can see the exterior holes 105 in the bowl, which are distributed around the sides and underside in the bowl, according to an embodiment of the disclosure. The bowl 100 may have the scrubbing bristles directly attached to its interior surface or it may have an optionally removable liner to which the bristles are attached, according to some embodiments. Holes 104 in the liner and adjacent holes 105 in the outer bowl allow water to drain out of the bowl, according to some embodiments. The diameter and density of the holes or pores 104 in the liner, as well as the corresponding holes 105 in the outer bowl may vary to suit different applications and to effect the rate of drainage of water from the bowl. Liners and bowls may also be produced with no holes or pores or with single holes that can be plugged or their aperture size varied, according to some embodiments. An optional foot ring 106 on the oval bowl provides a stable support and may be rubberized for gripping the surface upon which the bowl is placed. An optional lip 107 on the abrasive liner 101 makes it easier for the user to grip and pull the liner out of the outer bowl 103, in order to remove it for cleaning and drying.

Figure 3B:
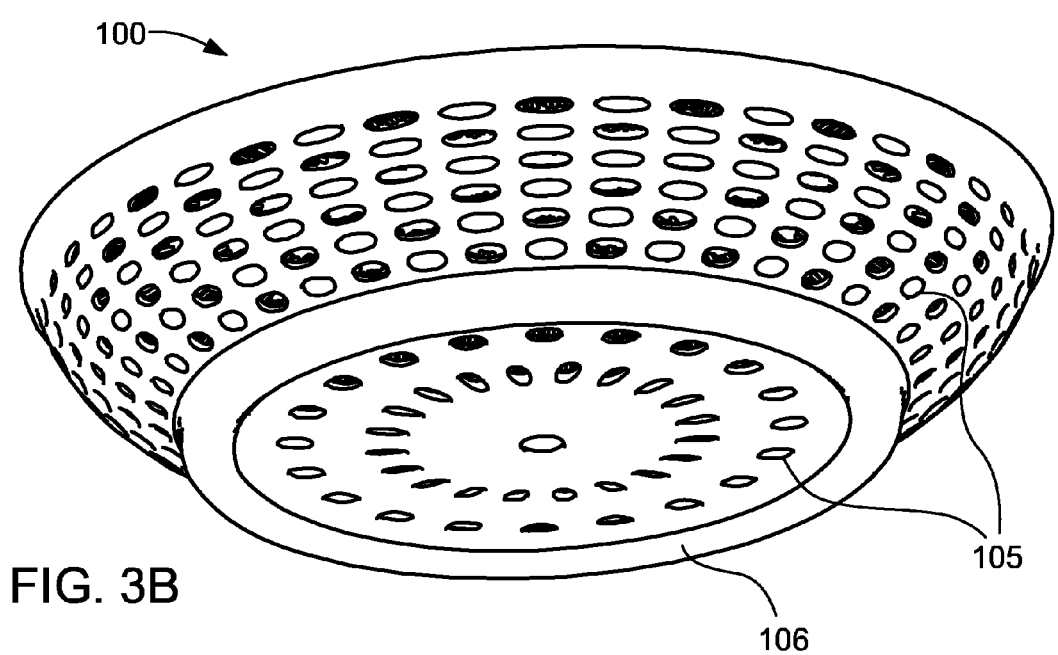
FIG. 3B depict another perspective view of the oval-shaped brush bowl such that one can see the exterior holes in the bowl which are distributed around the sides and underside of the bowl, according to an embodiment of the disclosure.

FIG. 3B depicts another perspective view of the oval-shaped brush bowl 100, such that one can see the exterior holes in the bowl 105, which are distributed around the sides and underside in the bowl, according to an embodiment of the disclosure. Reference numbers similar to or the same as reference numbers in other drawings identify similar or same elements described immediately herein and in other supporting descriptions.

According to other embodiments, the outer bowl 103 and/or abrasive liner 101 may optionally have no holes or they may have holes that can be completely or partially occluded at the time of use, according to the user's preference. Said holes can be occluded by various means, including the option of having the holes arranged such that if the liner is placed in the bowl in one orientation the holes in the liner and bowl line up, allowing water to freely pass through the bowl, but if the liner is twisted before or after placing it into the bowl, the holes in the liner no longer line up with the holes in the bowl. In the case of a circular bowl, the liner could optionally be twisted to any degree, allowing full or partial occlusion of the holes in the bowl. In the case of an oval bowl, the liner could be turned 180 degrees and then placed into the bowl, resulting in the holes in the bowl being occluded by the liner surface. By partially or fully occluding the holes in the outer bowl 103, the user can retard the flow of water out of the bowl such that the water flowing into the bowl partially fills it. Users may in some instances prefer having the fruit or vegetables immersed in water while they scrub them, which would be enabled by this optional feature.

Figure 4:
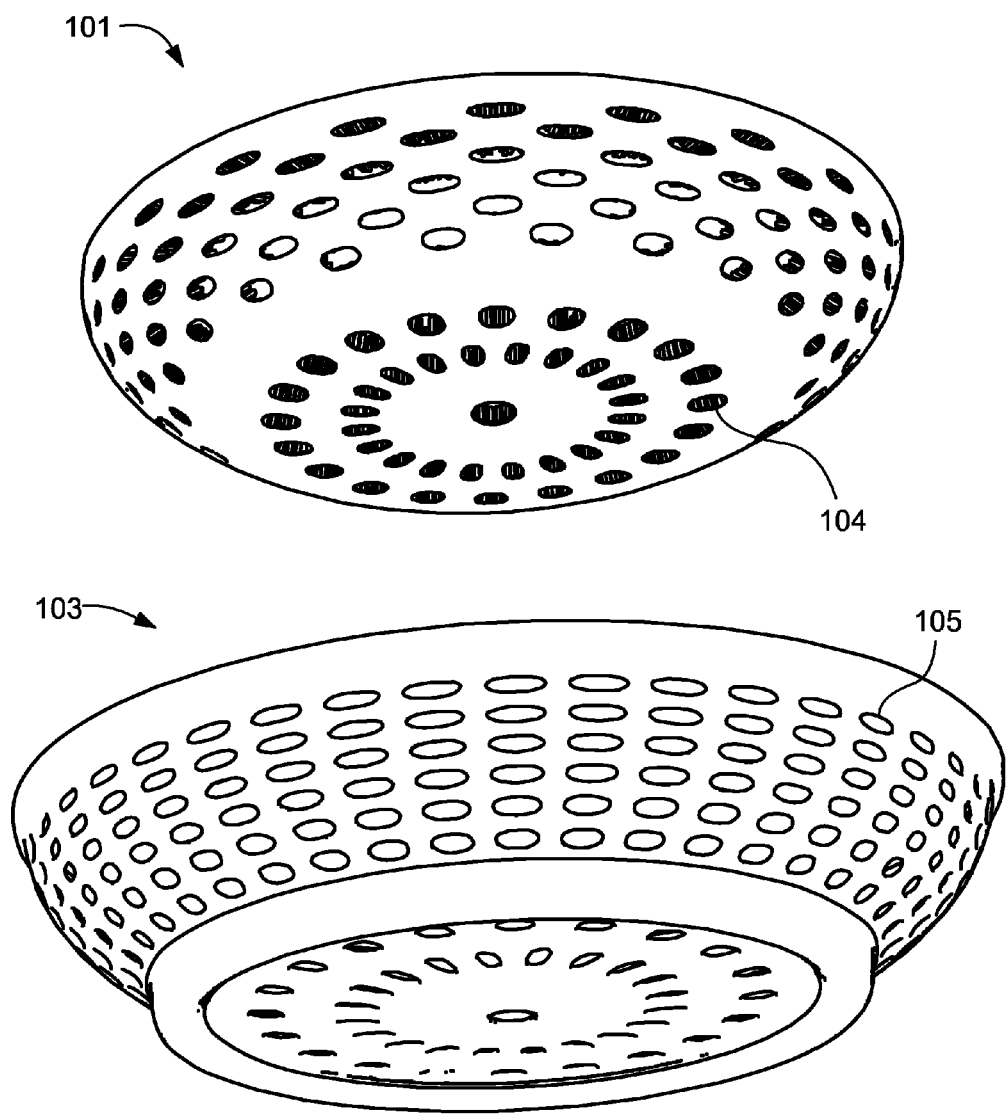
FIG. 4 illustrates a perspective view of the underside of the brush bowl with the optionally removable liner extracted from the bowl according to an embodiment of the disclosure.

FIG. 4 illustrates a perspective view of the underside of the outer bowl 103 with the optionally removable liner 101 extracted from said outer bowl according to an embodiment of the present disclosure. This optional feature makes it possible for the bowl and liner to be independently cleaned. The products may be manufactured of dishwasher-safe materials, including but not limited to plastic, metal and silicone or a combination of dishwasher-safe materials. According to some embodiments, the liner 101 may compose flexible materials such that it can be compressed or collapsed, allowing for compact storage and easy insertion into irregular spaces in a dishwasher. The liner 101 can also be turned inside-out or inverted by hand such that the bristles 102 are splayed out in order to more easily clean the spaces between said bristles of any trapped food matter. In its inverted state, the liner 101 may be suspended upside-down underneath a running faucet, which would aid in flushing out trapped particulates. The liner 101 can also be stored in its inverted state on a counter or rack allowing the spread bristles to air dry more rapidly. The outer bowl 103 may also be collapsible or compressible, according to some embodiments. In one embodiment, the bristles 102 or abrasive surface may be directly bonded to the bowl such that there is no removable liner. Said bowl with integrated bristles or abrasive surfacing may be rigid, semi-rigid or flexible and may optionally be collapsible, according to various embodiments. The liner 101 defines multiple liner openings 104 adapted for fluid to pass there through.

Figure 5:
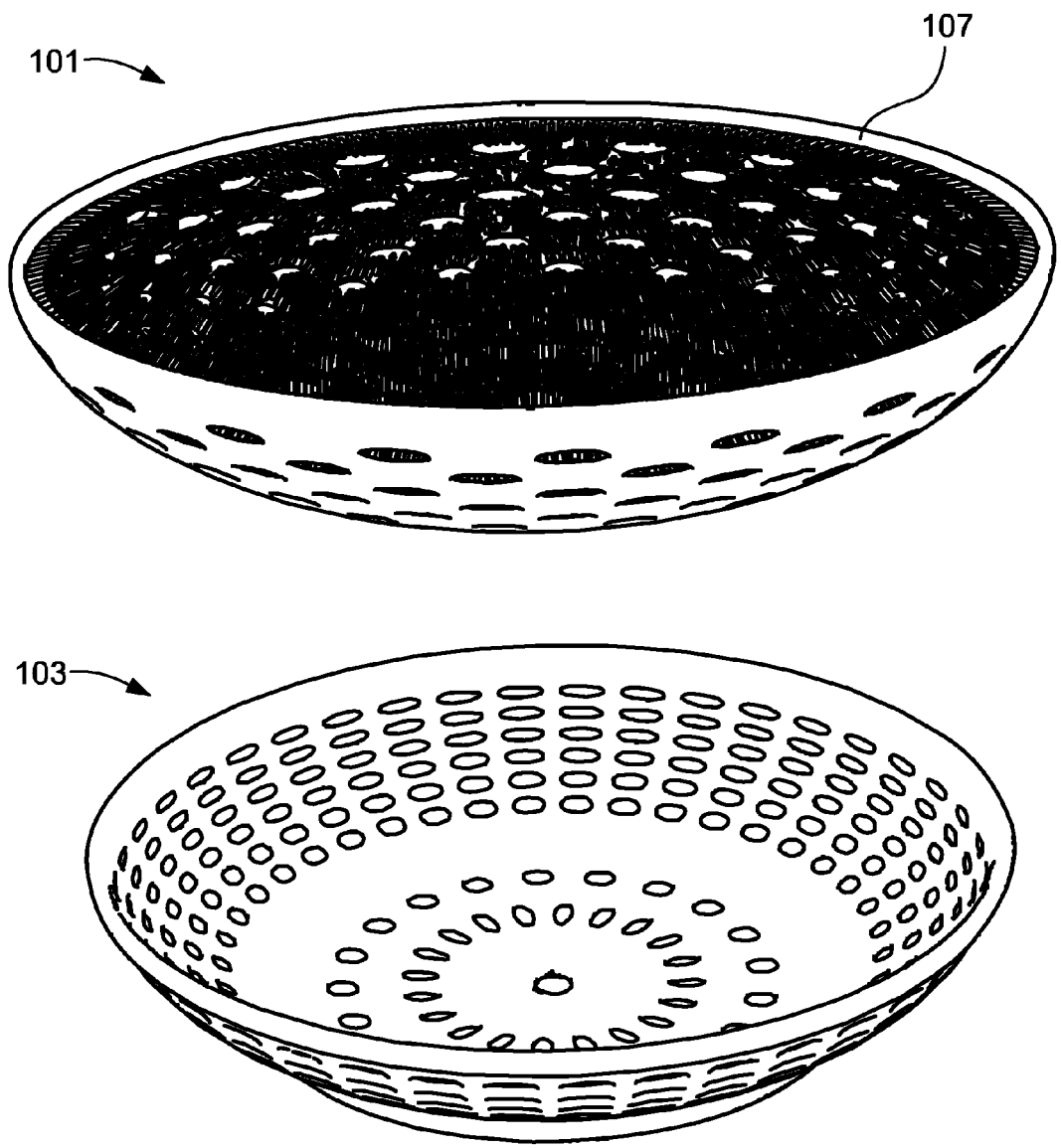
FIG. 5 illustrates a perspective view of the top of the brush bowl with the optionally removable liner extracted from the bowl, according to an embodiment of the disclosure.

FIG. 5 illustrates a perspective view of the top of the bowl 103 with the optionally removable liner 101 extracted from the bowl according to an embodiment of the present disclosure. Reference numbers similar to or the same as reference numbers in other drawings identify similar or same elements described immediately herein and in other supporting descriptions.

Figure 6:
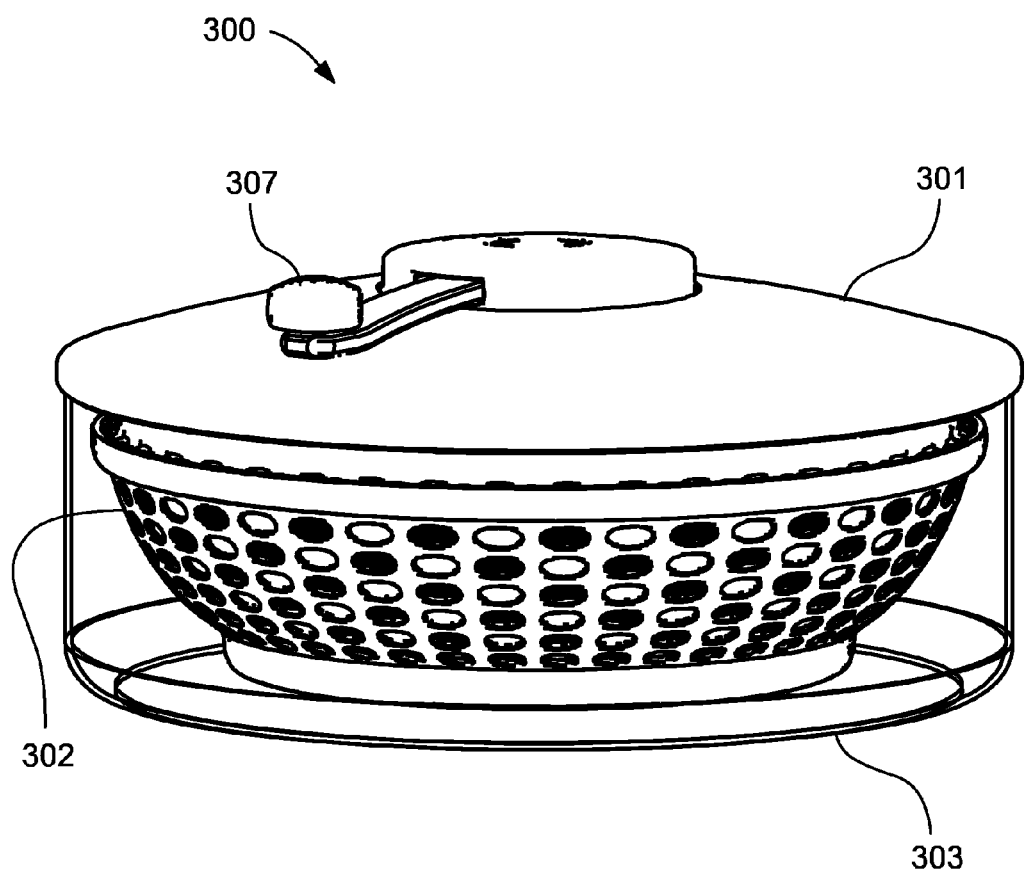
FIG. 6 illustrates a combination salad spinner and fruit and vegetable scrubbing bowl, according to an embodiment of the disclosure.

FIG. 6 illustrates a combination salad spinner and fruit and vegetable scrubbing bowl 300, according to an embodiment of the present disclosure. The scrubbing bowl 302 is able to spin inside a larger salad spinner outer bowl 303, thereby providing the dual purpose of an internal spinner bowl and a scrubbing bowl. In the depicted embodiment, the larger salad spinner outer bowl 303 is translucent or clear, such that the scrubbing bowl 302 can be seen in its position inside it. Reference numbers similar to or the same as reference numbers in other drawings identify similar or same elements described immediately herein and in other supporting descriptions.

The scrubbing bowl 302 can be used on its own, over a sink and independently of the salad spinner to scrub produce or it can be inserted into the larger salad spinner outer bowl 303 and used to scrub produce while in this position. When the scrubbing bowl 302 is inserted in the salad spinner outer bowl 303 the user is able to scrub produce without occupying the sink area. Prior to use, the larger salad spinner outer bowl 303 with the scrubbing bowl 302 inserted can be partially or mostly filled with water to allow the user to immerse the produce during scrubbing, according to his or her preference. Once the food has been cleaned to the user's satisfaction, the user can lift out the scrubbing bowl, draining water therefrom into the salad spinner outer bowl 303, and then empty water out of said salad spinner bowl into the sink. The scrubbing bowl 302 can then be placed back into the larger spinner bowl where it can be used to spin dry any vegetables that need to be dried prior to serving. The salad spinner lid 301 has an integrated spinner mechanism that can be configured in various ways according to existing salad spinner mechanisms. In the depicted embodiment the mechanism is operated by turning the handle 307 which causes an internal gear mechanism to engage with and spin the scrubbing bowl 302.

Figure 7:
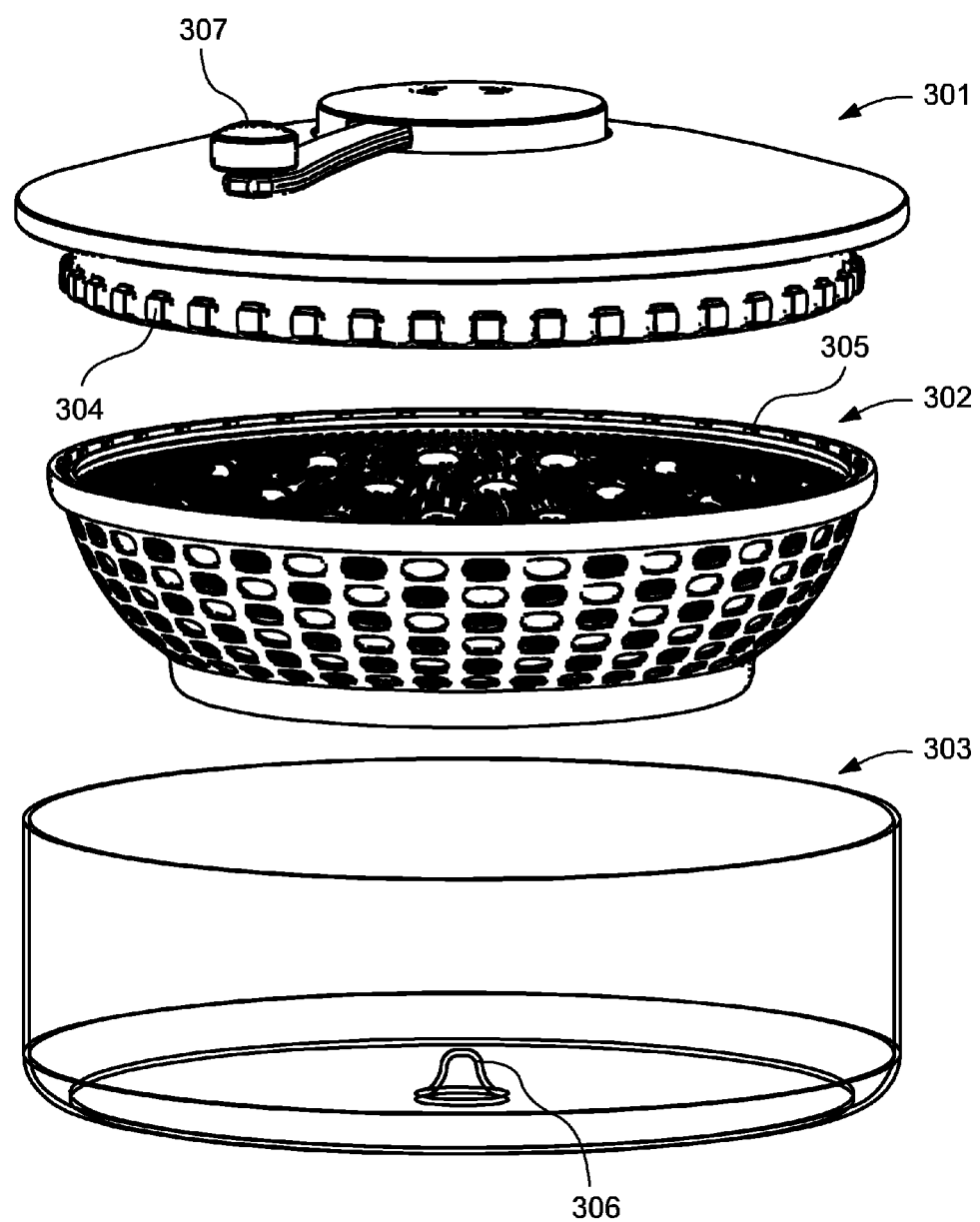
FIG. 7 illustrates a combination salad spinner and fruit and vegetable scrubbing bowl, in which the spinner and lid mechanism has been lifted off and the scrubbing bowl removed from the larger salad spinner bowl according to an embodiment of the disclosure.

FIG. 7 illustrates a combination salad spinner and fruit and vegetable scrubbing bowl, in which the salad spinner and lid 301 mechanism has been lifted off and the scrubbing bowl 302 removed from the larger salad spinner outer bowl 303 in accordance with an embodiment of the disclosure. The spinner mechanism can take any of a number of forms common to salad spinners, such as a crank handle 307 as depicted in the illustration, or a handle attached to a pull cord, according to some embodiments. The scrubbing bowl 302 can be adapted so that it can spin inside the salad spinner. In the depicted embodiment this has been accomplished by the creation of a ring of inward-facing gear cogs 305 near its upper lip, which engage with a complimentary array of outward-facing gear cogs 304 that are positioned around the lower spinning section of the spinner lid 301. When the crank handle 307 or pull cord is operated by the user, said gears 304 underneath said spinner lid are caused to spin rapidly. When the lid is placed on top of the salad spinner outer bowl 303, gear cogs 304 fit in between and engage with gear cogs 305 of the scrubbing bowl 302, such that when the crank handle 307 is turned, the scrubbing bowl 302 is caused to spin, and resulting in pressing the produce against the scrubbing protrusions and excess water being shed by centrifugal force from the produce contained in the scrubbing bowl 302 outward through the holes in the scrubbing bowl. The scrubbing bowl 302 may have an indentation centrally positioned underneath in order to enable said scrubbing bowl to balance upon a bump or pivot point 306 that protrudes upward from the bottom of the bowl. By resting the scrubbing bowl's weight on said pivot point 306 below, the scrubbing bowl 302 is able to spin with minimal friction.

Figure 8:
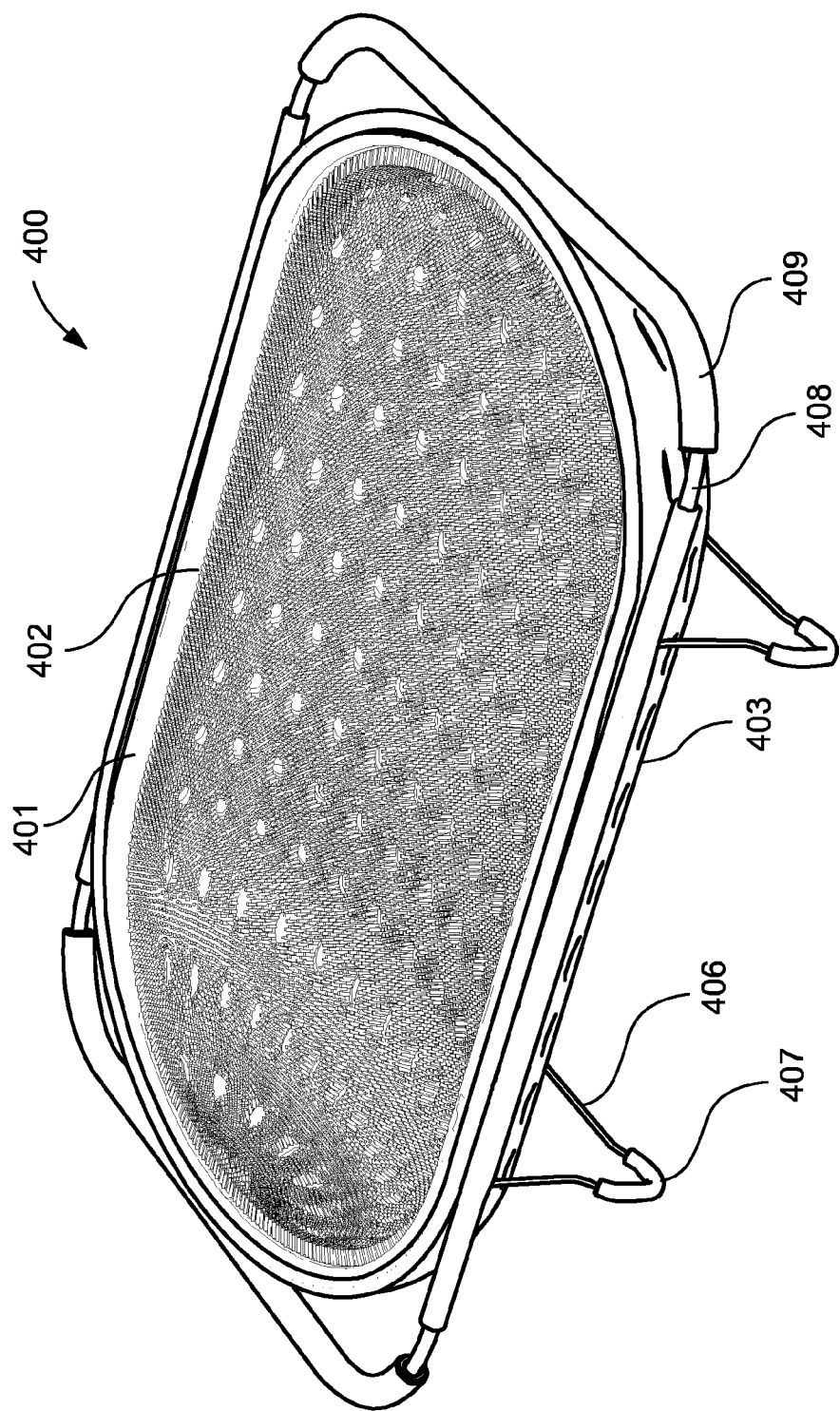
FIG. 8 depicts a perspective view of a scrubbing bowl that incorporates a stand and extendable support arms which make it possible to securely rest the bowl in a sink according to an embodiment of the disclosure.

FIG. 8 depicts a perspective view of a variation of the scrubbing bowl 400 that incorporates a stand and extendable support arms 408 which make it possible to securely rest said bowl in a sink according to an embodiment of the disclosure. The scrubbing bowl 400 does not need to touch the inside surface of the sink, according to some embodiments. Said support arms may have shrouds 409 composed of material such as plastic, silicone or rubber that provides some traction when said support arms are resting on the sides of the sink. The legs 406 may also have feet 407 composed of a similar material as the arm shrouds 409. In the depicted embodiment the stand is designed so that said bowl can be placed on its feet 407 facing up or stored on its side. Said legs 406 may optionally be configured to fold up and retract in order to make the bowl 500 even more compact for storage, according to some embodiments. The depicted bowl 400 has the approximate shape of a rectangle with rounded ends. The gradual curvature in the bowl interior makes it easier to push and roll produce around inside the bowl without any corners or sharp bends to slow down or stop the motion. Similar to earlier depictions of other embodiments of the device, the bowl 400 may comprise an optionally removable liner 401 with bristles 402 or other abrasive material and an outer bowl 403. Said outer bowl and liner may also incorporate drainage holes.

Figure 9:
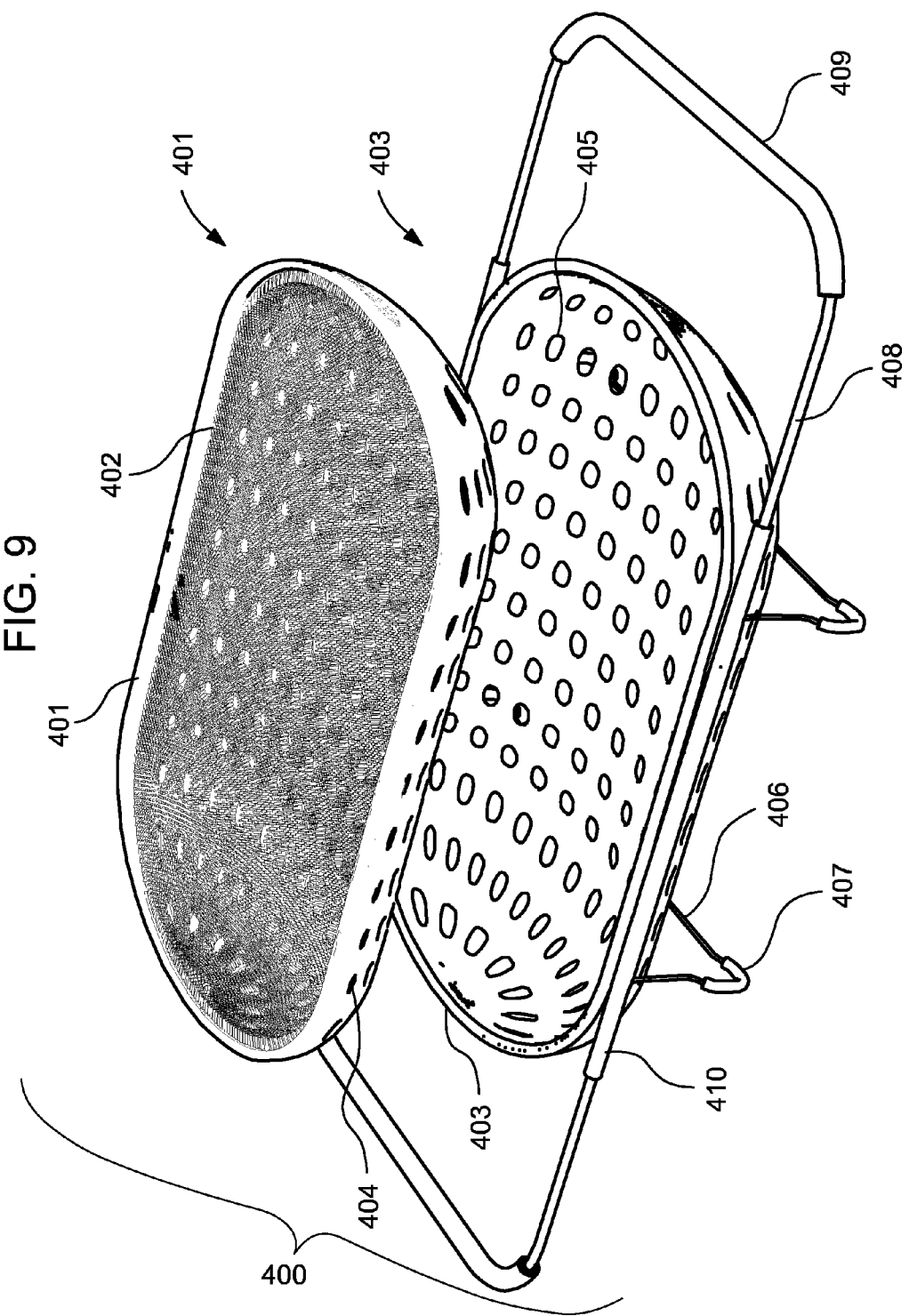
FIG. 9 depicts a perspective view of the brush bowl as depicted in FIG. 8, but with the arms extended and the optionally removable liner extracted from the bowl according to an embodiment of the disclosure.

FIG. 9 depicts a perspective view of the brush bowl 400 as depicted in FIG. 8, but with the arms extended and the optionally removable liner extracted from the bowl according to an embodiment of the disclosure. The extendable arms 408 extend out of their housing tubes 410, and the optionally removable liner 401 is extractable from the outer bowl 403 according to an embodiment of the disclosure. Reference numbers similar to or the same as reference numbers in other drawings identify similar or same elements described immediately herein and in other supporting descriptions.

Figure 10:
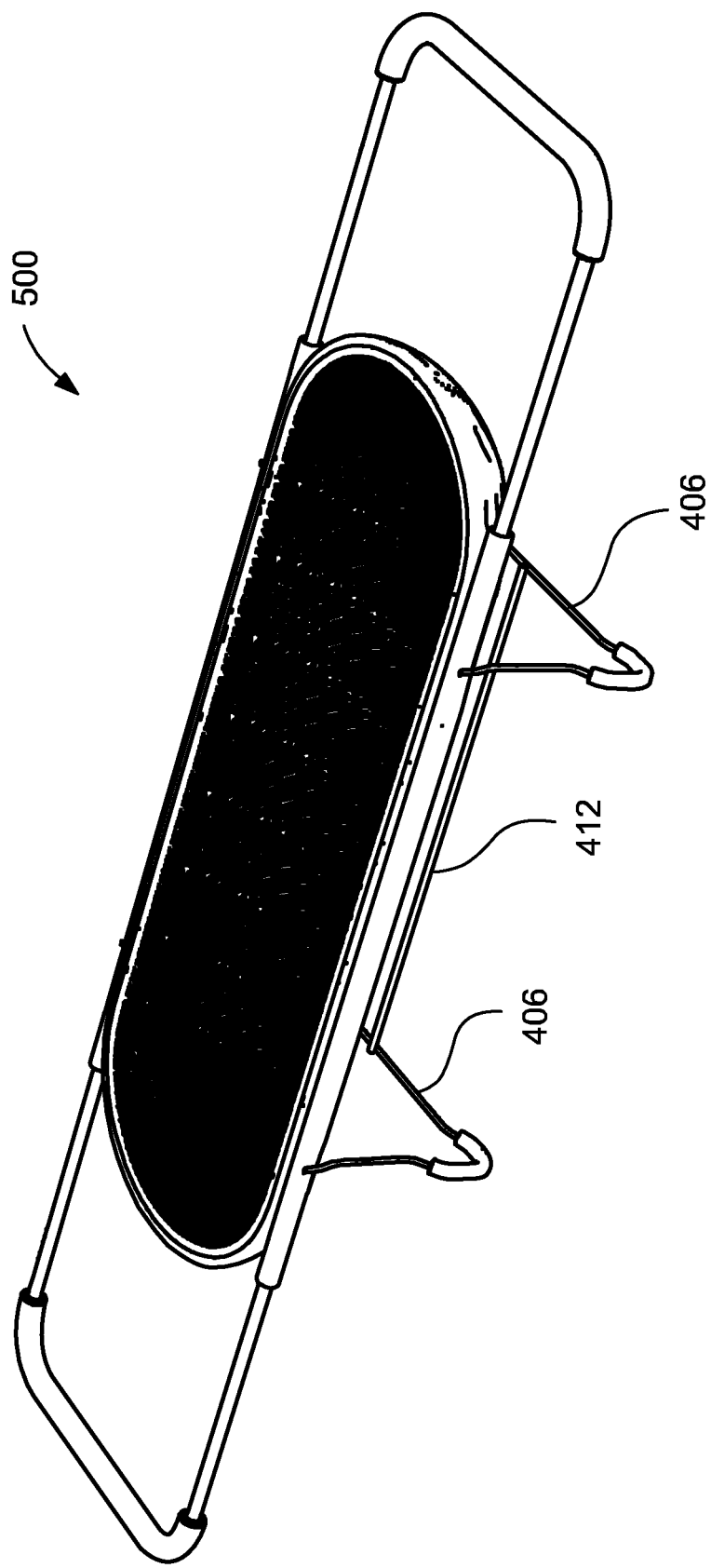
FIG. 10 depicts a perspective view of a narrow version of the brush bowl with extendable support arms according to an embodiment of the disclosure.

FIG. 10 depicts a perspective view of a narrow version of the brush bowl 500 with extendable support arms according to an embodiment of the disclosure. This narrow version is designed to rest in a sink while providing room for the sink to be accessed for other uses. In this depiction, the extendable support arms have been extended. In this depiction, an optional cross-member 412 can be seen connecting the legs 406 to provide reinforcement to said legs. Reference numbers similar to or the same as reference numbers in other drawings identify similar or same elements as described immediately herein and in other supporting descriptions.

Figure 11:
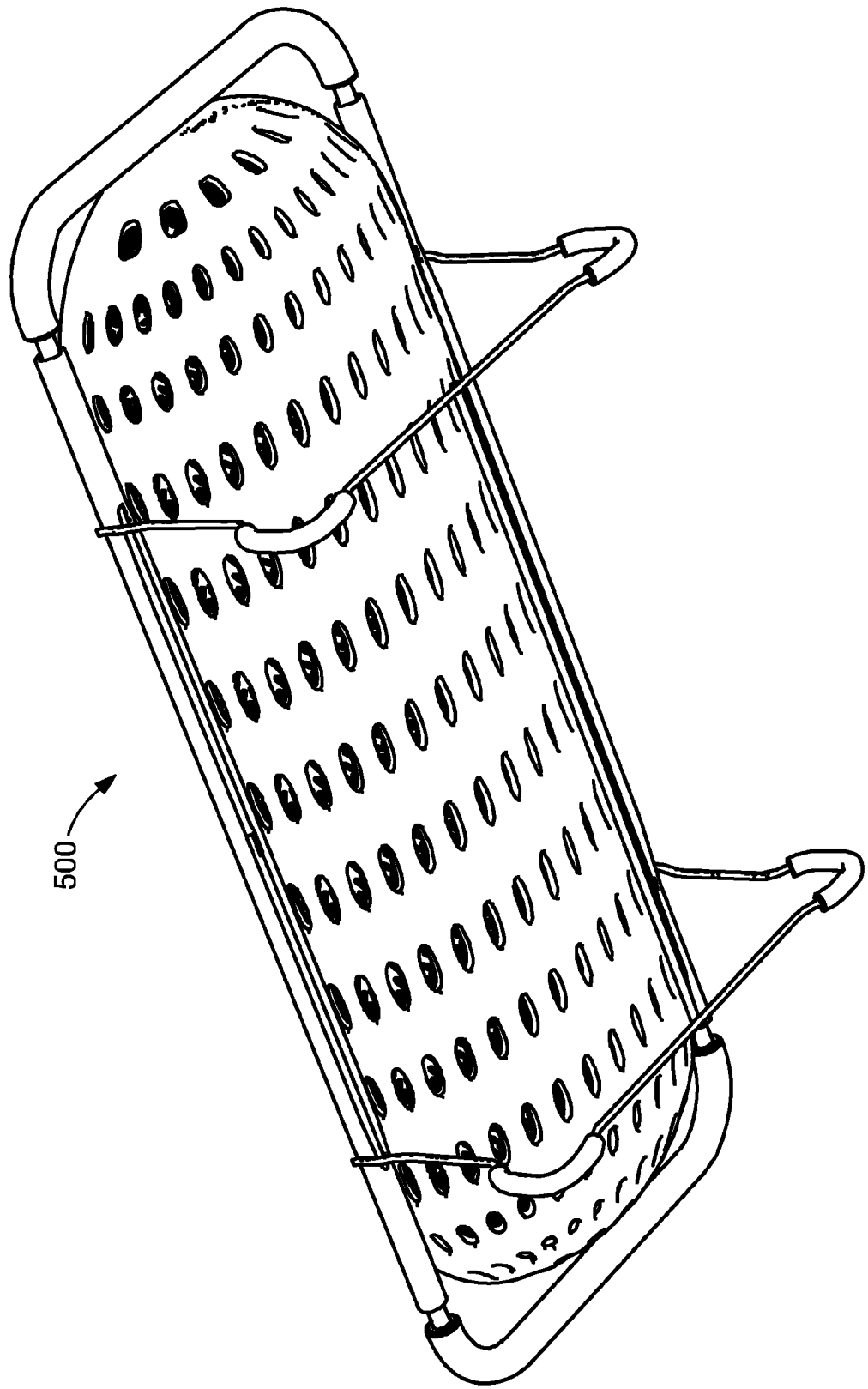
FIG. 11 depicts a perspective view of the underside of the narrow version of the brush bowl with extendable support arms according to an embodiment of the disclosure.

FIG. 11 depicts a perspective view of the underside of the narrow version of the brush bowl 500 with extendable support arms according to an embodiment of the disclosure. The wire stand below is clearly visible and incorporates rubberized shrouds or feet where it would rest on a surface. In addition, these rubber shrouds or feet wrap around the sides of the stand which has been shaped such that the bowl can stand upright on its side and rest on said feet. In this depiction the extendable supporting arms have been retracted. Reference numbers similar to or the same as reference numbers in other drawings identify similar or same elements as described immediately herein and in other supporting descriptions.

Figure 12:
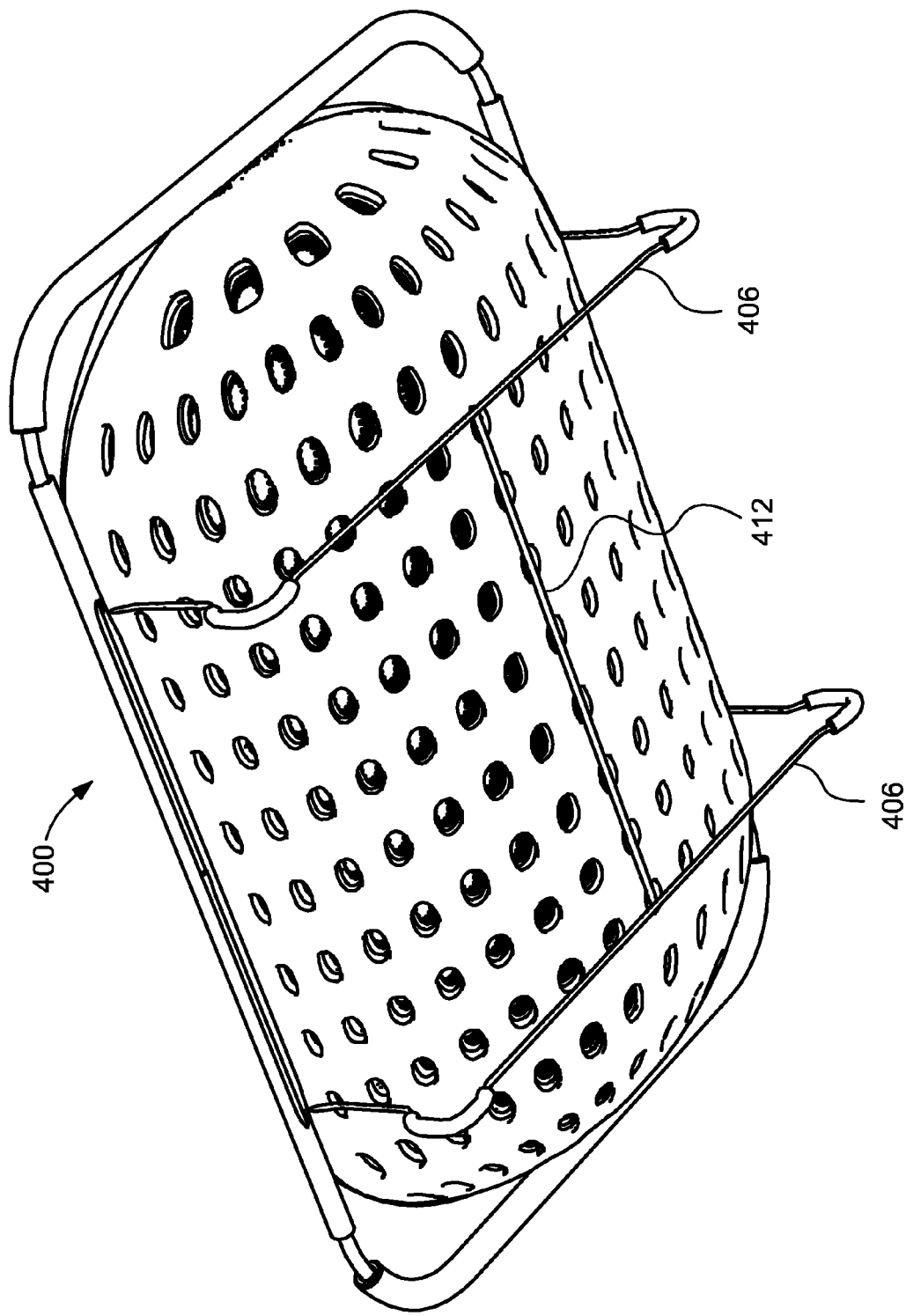
FIG. 12 depicts a perspective view of the underside of the wide version of the brush bowl with an optional cross member and extendable support arms retracted according to an embodiment of the disclosure.

FIG. 12 depicts a perspective view of the underside of the wide version of the bowl 400 with an optional cross member and extendable support arms retracted according to an embodiment of the disclosure. In this depiction, the optional cross-member 412 can clearly be seen connecting the legs 406 to provide reinforcement to said legs. Reference numbers similar to or the same as reference numbers in other drawings identify similar or same elements as described immediately herein and in other supporting descriptions.

Figure 13:
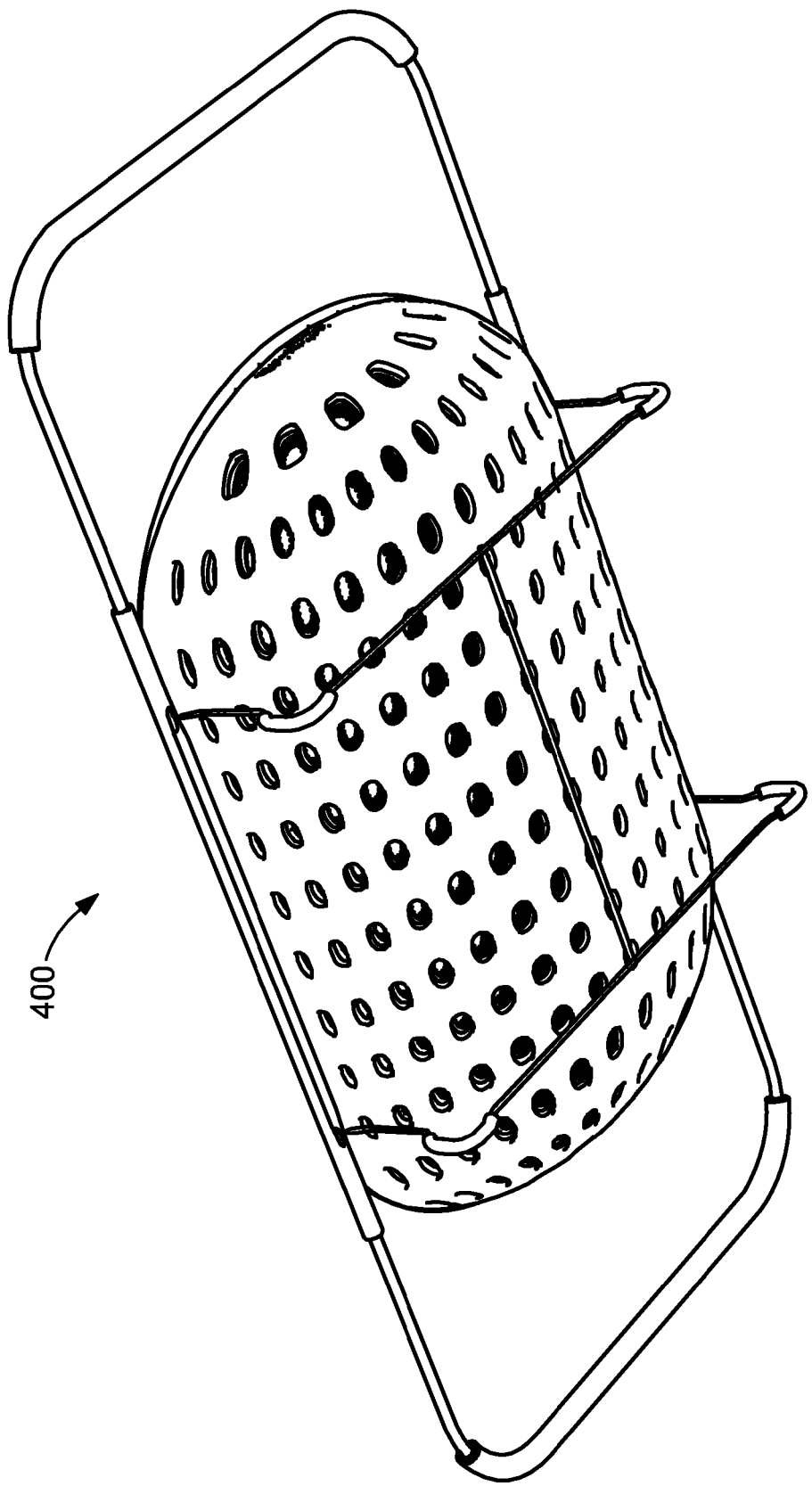
FIG. 13 depicts a perspective view of the underside of the wide version of the brush bowl with extendable support arms extended according to an embodiment of the disclosure.

FIG. 13 depicts a perspective view of the underside of the wide version of the bowl 400 with extendable support arms extended in accordance with an embodiment of the present disclosure. Reference numbers similar to or the same as reference numbers in other drawings identify similar or same elements as described immediately herein and in other supporting descriptions.

Figure 14:
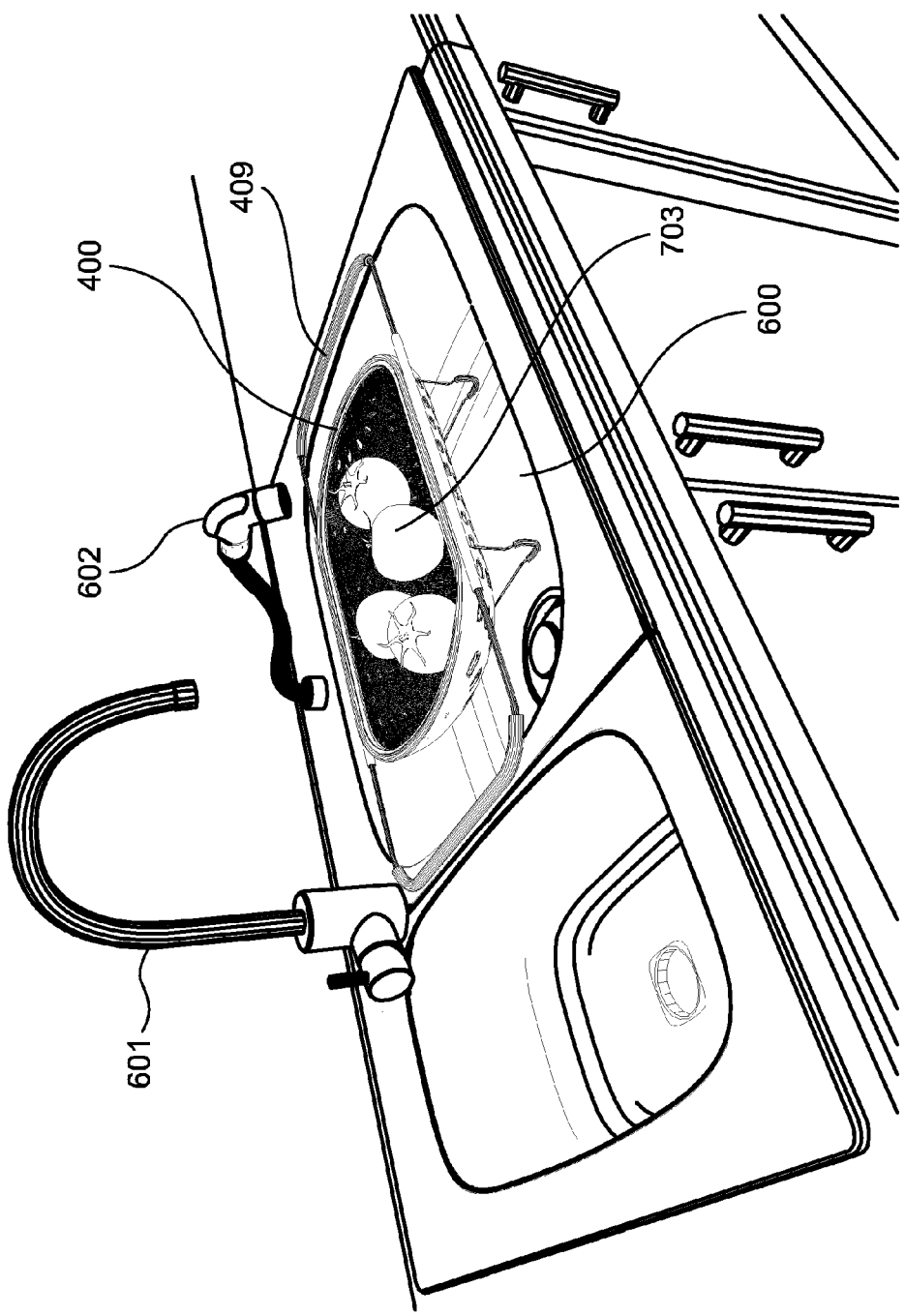
FIG. 14 depicts a perspective view of the wide version of the brush bowl with extendable support arms extended out such that said arms are resting on the edges of the sink according to an embodiment of the disclosure.

FIG. 14 depicts a perspective view of the wide version of the bowl 400 with extendable support arms 409 extended out such that said arms are resting on the edges of the sink 600 in accordance with an embodiment of the disclosure. The bowl 400 is suspended in said sink, which helps to keep it from touching the inside surface of the sink so that its feet stay clean. During scrubbing, water can be sprayed onto the produce in the bowl from the faucet 601 or from extendable water sprayer 602, if available. By securing the bowl over the sink, the extendable arms free up the user's hands so that they can be employed in scrubbing the produce and operating the faucet or extendable sprayer. In this depiction, tomatoes 703 have been placed in the bowl for scrubbing.

The extendable water sprayer 602 is depicted hovering over the produce as it might be positioned during use. The hands that would be engaged in holding the sprayer in this position and in scrubbing the produce are not depicted.

FIG. 15 depicts a perspective view of a narrow version of bowl 500 with extendable support arms in place over the sink according to an embodiment of the present disclosure. As illustrated, this narrow version can be positioned toward the back of the sink to provide room for the sink to be accessed for other uses such as washing dishes. Reference numbers similar to or the same as reference numbers in other drawings identify similar or same elements as described immediately herein and in other supporting descriptions.

FIG. 16A depicts a kitchen sink in which the scrubbing bowl 400 with extendable arms has been stored on its side behind the sink against the wall, with its arms retracted according to an embodiment of the present disclosure. Reference numbers similar to or the same as reference numbers in other drawings identify similar or same elements as described immediately herein and in other supporting descriptions.

FIG. 16B depicts a side view of the scrubbing bowl has been stood on its side, demonstrating its ability to be easily stored in a compact manner out of the way according to an embodiment of the disclosure. It is clear from this illustration how the legs 406 have been shaped with feet 407 wrapping around the sides such that the bowl can stand upright on its side. The ability to stand on its side allows the device to be easily stored in a compact manner. Reference numbers similar to or the same as reference numbers in other drawings identify similar or same elements as described immediately herein and in other supporting descriptions.

FIG. 17A depicts a perspective view of a carrot and celery scrubber hand tool 800 which has a ring-shaped orifice 802 defined by a radial supporting structure incorporating inward-facing bristles or abrasive mesh, through which relatively narrow and long items such as carrots and celery may be scrubbed back and forth according to an embodiment of the present disclosure. The hand tool 800 includes a handle 801. Reference numbers similar to or the same as reference numbers in other drawings identify similar or same elements as described immediately herein and in other supporting descriptions. The interior surface of said orifice incorporates inward-facing bristles or abrasive mesh.

Said orifice may optionally be adjustable so that it can be adapted for use with produce of varying diameters. Alternatively, it could be a single size, large enough to accommodate carrots of wide girth. In such an embodiment, relatively small diameter produce can still be scrubbed in a ring that is wider by alternately pressing each side of the produce against the facing scrubbing material as one scrubs the produce back and forth through the ring. In another embodiment, the orifice may be composed of a stretchable material such that it can flex to accommodate wider produce and in other embodiments the depth of said orifice may be extended such that it is more of an elongated tube shape.

FIG. 17B depicts a perspective view of the underside of a scrubbing bowl with extendable arms extended, in which the detachable carrot and celery scrubber hand tool 800 has been docked with the bowl for convenient storage as well as hands-free use, according to an embodiment of the disclosure. Reference numbers similar to or the same as reference numbers in other drawings identify similar or same elements as described immediately herein and in other supporting descriptions. A docking rack or clip 803 of some form for holding the hand tool 800 may be integrated into one side of the bowl. In this depiction, the tool can optionally be usable while it is docked with the bowl, according to some embodiments.

Figure 18:
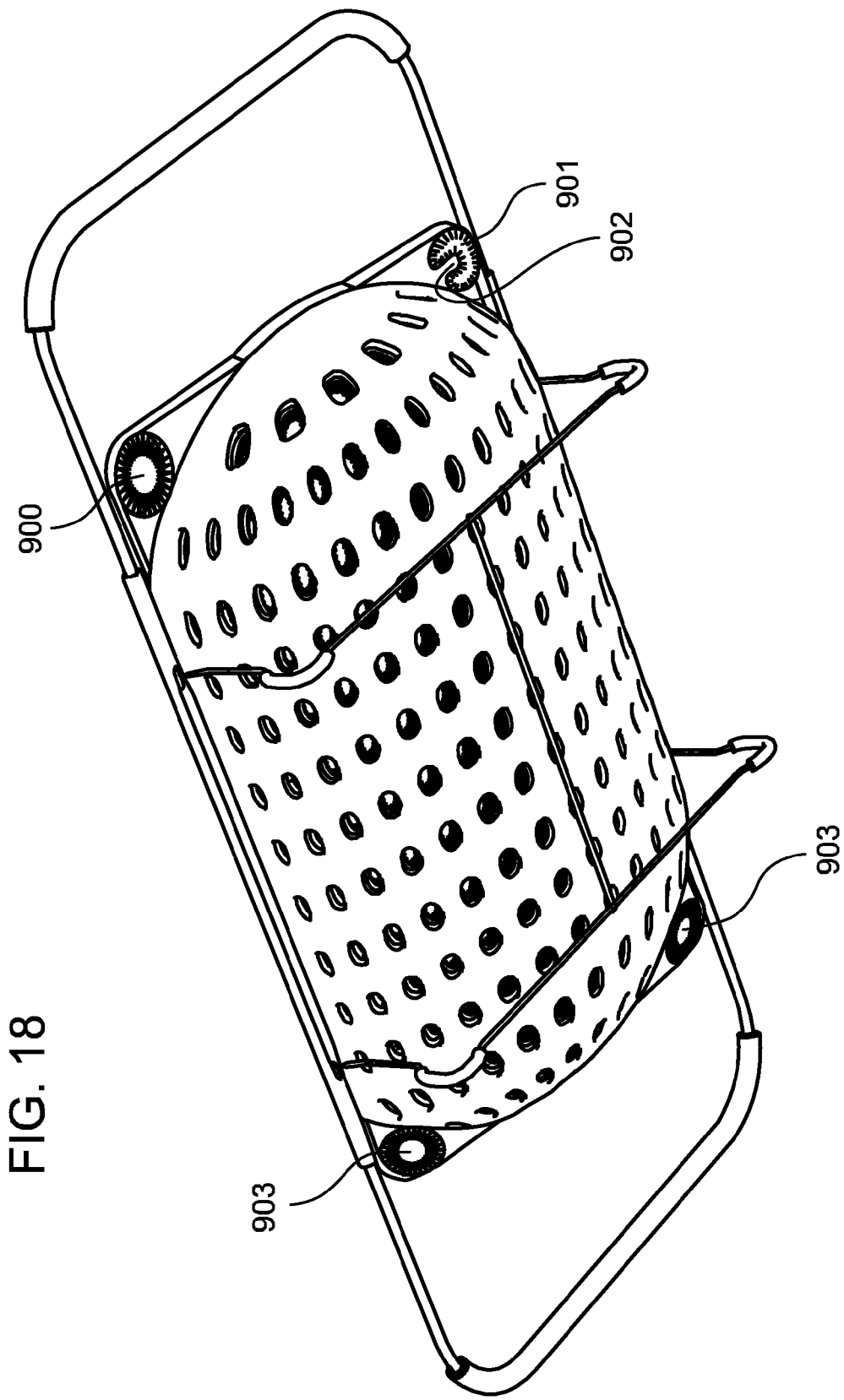
FIG. 18 depicts a perspective view of the underside of the scrubbing bowl with extendable arms extended, in which one or more scrubber rings or tubes for scrubbing relatively narrow and long produce such as carrots and celery have been integrated according to an embodiment of the disclosure.

FIG. 18 depicts a perspective view of the underside of the scrubbing bowl with extendable arms extended, in which one or more scrubber rings or orifices 900, 901 and 903 for scrubbing relatively narrow and long produce such as carrots and celery have been integrated according to an embodiment of the present disclosure. Said scrubber rings are designed for scrubbing relatively narrow and long produce such as carrots and celery. The inside surface of the ring comprises inward pointing bristles or other abrasive material such as a mesh. The scrubber ring is depicted in position near to the corner of the bowl, but may be in any position and orientation relative to the bowl. Alternatively, one or more holes with inward-facing bristles or abrasive material, and which are large enough to accommodate carrots and celery sticks may be integrated into the sides of the bowl body. Said scrubbing rings may be in a variety of forms and sizes. For example, in the depiction, a large scrubber ring 900 can accommodate larger diameter carrots, whereas smaller scrubbing rings 903 are designed for narrower carrots, and celery scrubber ring 901 supporting structure has a central scrubbing protrusion 902 designed to scrub the trench inside a celery stick. Therefore, a radial supporting structure for the brush bowl cleaning liner may be a celery scrubber ring. The inside surface of the ring comprises inward-pointing bristles or other abrasive material such as a mesh. The scrubber rings are depicted in position near to the corners of the bowl, but may be in a variety of positions and orientations relative to the bowl. Alternatively, one or more holes with inward-facing bristles or abrasive material, and which are large enough to accommodate carrots and celery sticks may be integrated into the concave area of the bowl.

Figure 19:
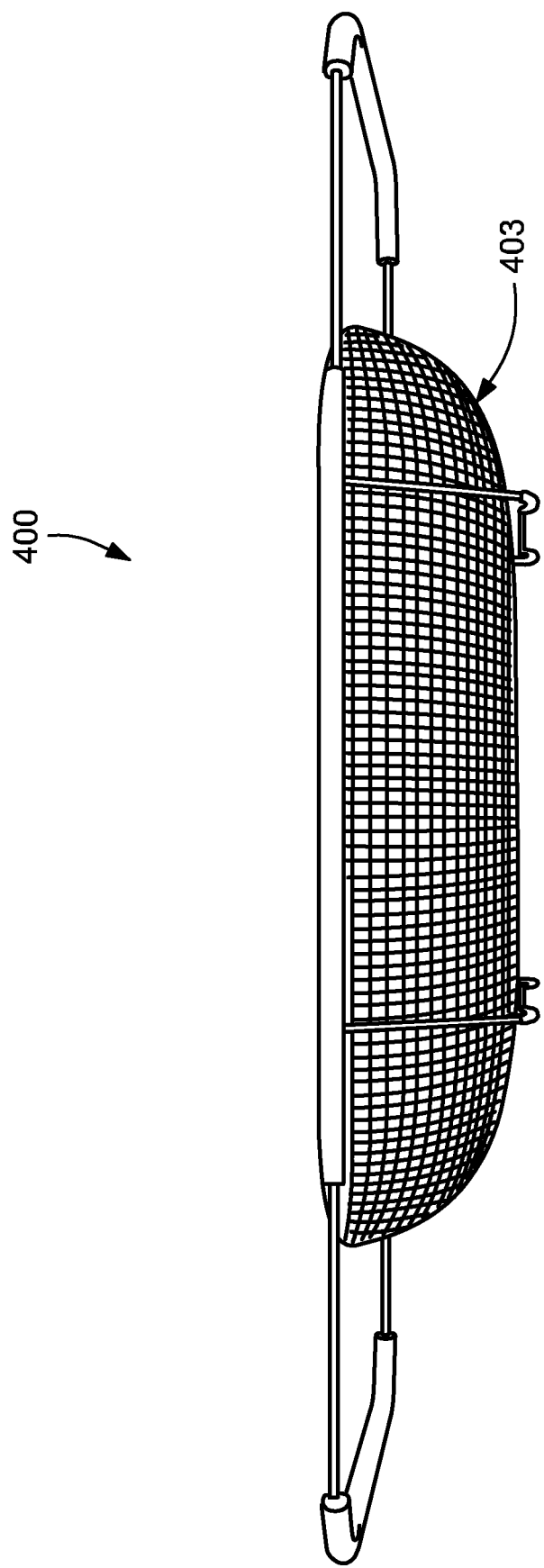
FIG. 19 depicts a wide version of the brush bowl with extendable support arms extending out and in which the outer bowl is made of a wire mesh, according to an embodiment of the disclosure.

FIG. 19 depicts a wide version of the brush bowl 400 with extendable support arms extending out and in which the outer bowl 403 is made of a wire mesh, according to an embodiment of the disclosure. Reference numbers similar to or the same as reference numbers in other drawings identify similar or same elements as described immediately herein and in other supporting descriptions. In many of the illustrations, the outer bowl is illustrated as manufactured as a single part with holes arrayed through its surface, but this is not the only way the outer bowl can be constructed. Alternative embodiments can be made of such materials as woven wire mesh similar to that depicted in FIG. 19, which would also provide the functions of providing support for the scrubbing material and produce inside the bowl, as well as allowing drainage of water through the bowl.

Figure 20A:
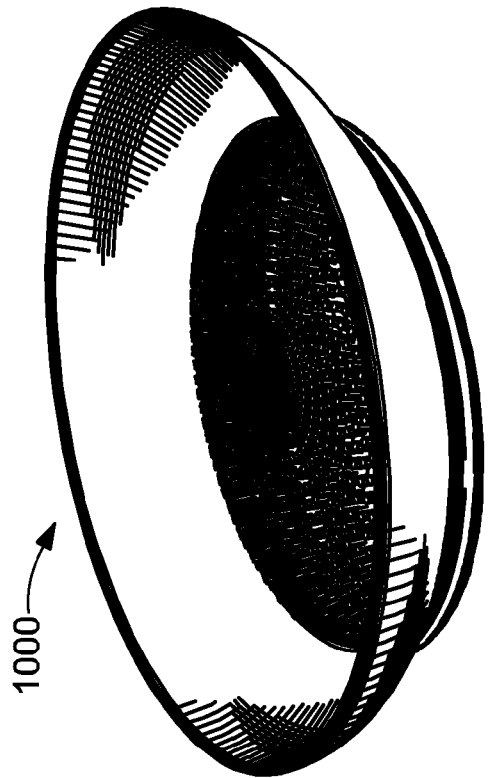
FIG. 20A depicts an embodiment of the brush bowl in which an abrasive bottom is attached to an upper section of the bowl and may be used independently as a hand-held scrubbing brush when detached according to an embodiment of the disclosure.

FIG. 20A depicts an embodiment of the brush bowl 1000, in which an abrasive bottom 1002 is attached to an upper section of the bowl 1001 and may be used independently as a hand-held scrubbing brush when detached in accordance with an embodiment of the disclosure. Reference numbers similar to or the same as reference numbers in other drawings identify similar or same elements as described immediately herein and in other supporting descriptions. The bottom portion 1002 may be attached and detached to the upper section of the bowl by respective threads or a snapping pin and depression or other mechanisms as discussed below and methods known to those skilled in the art of plastics, ceramics, metals and other materials for bowls and retaining structures.

Figure 20B:
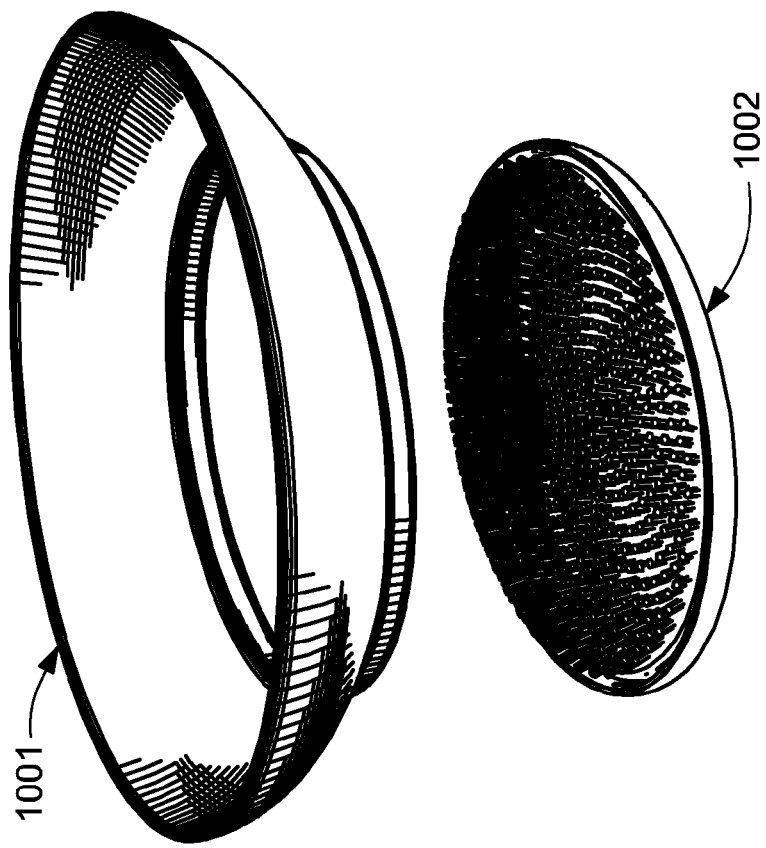
FIG. 20B depicts an embodiment of the brush bowl in which an abrasive bottom is detached from an upper section of the bowl and may be used independently as a hand-held scrubbing brush according to an embodiment of the disclosure.

FIG. 20B depicts an embodiment of the brush bowl 1000, in which an abrasive bottom 1002 is detached from an upper section of the bowl 1001 and may be used independently as a hand-held scrubbing brush when detached in accordance with an embodiment of the disclosure. Reference numbers similar to or the same as reference numbers in other drawings identify similar or same elements as described immediately herein and in other supporting descriptions. A radial supporting structure for the brush bowl may include a retaining bowl, comprising a perimeter of a circular shape, an oblong shape, an oval shape an any other common bowl shape. Another supporting structure for the cleaning liner may be a ring, wherein the ring is at least one of integrated with a retaining bowl structure and separable from a retaining structure such as in a hand held device.

The abrasive bottom 1002 can be snapped back into the upper section of the bowl 1001 for use as a scrubbing bowl. The two parts 1001 and 1002 can connect together by various means, including for example, a lip around the perimeter of one part that securely grips the other part. The abrasive surface is depicted on the bottom 1002 and not the upper section 1001, but in other embodiments the inward-facing walls of the upper 1001 section can also have abrasive surfacing.

In other embodiments the abrasive material can be on the inward-facing walls of the upper section 1001 and not on the bottom 1002. In similar fashion, drainage holes can either be situated in the bottom 1002, the walls of the upper section 1001, or both. The situation of drainage holes can be independent of the abrasive surfacing, either coinciding with the abrasive surfacing, such as is seen in previous depictions where holes are between the bristles, or in a surface where there is no abrasive material. Said flexibility in the positioning of holes and abrasive surfacing can also be applied to bowls in which the bottom is not removable, for example in a bowl in which abrasive material and drainage holes are placed at the bottom and not the sides of the bowl according to one embodiment, or where abrasive material is on the sides of the bowl and not the bottom, and with drainage holes in the bottom area, according to another embodiments.

FIG. 21 depicts an embodiment of the brush bowl 1000, in which an abrasive bottom 1002 with a handle is separated, removed or detached from the upper section of the bowl 1001 and may be used independently as a hand-held scrubbing brush in accordance with an embodiment of the disclosure. A matching and corresponding bottom portion of the cleaning liner is therefore also separated, removed or detached from the rest of the cleaning liner in the brush bowl. Reference numbers similar to or the same as reference numbers in other drawings identify similar or same elements as described immediately herein and in other supporting descriptions. The detachable abrasive bottom 1003 incorporates a handle 1004.

In an embodiment of the present disclosure, the cleaning liner may further comprise a composition of a plurality of anti-bacterial materials and coatings that retard and deter the growth of bacteria on the substrate and the cleaning protrusions.

Figure 22A:
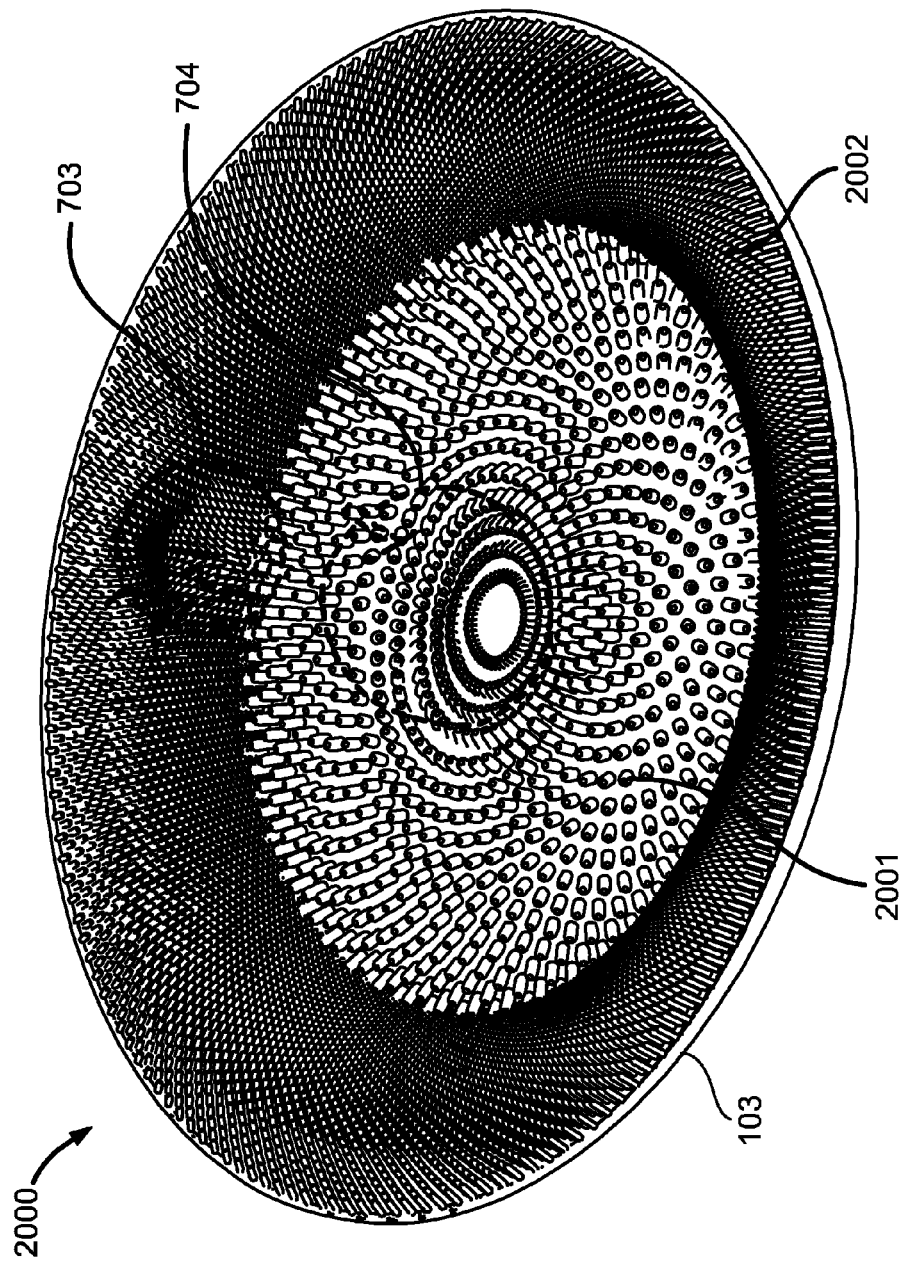
FIG. 22A depicts a brush bowl where various bristles disposed on sides of the bowl move toward objects (depicted in broken lines) depressed against the liner and clean the objects via the movement in accordance with an embodiment of the disclosure.

FIG. 22A depicts a brush bowl where various bristles disposed on sides of the bowl move toward objects (depicted in broken lines) depressed against the liner and clean the objects via the movement in accordance with an embodiment of the disclosure. Reference numbers similar to or the same as reference numbers in other drawings identify similar or same elements as described immediately herein and in other supporting descriptions. The cleaning liner may comprise a flexible substrate retainable in a supporting structure, the liner configured to define at least one opening for a fluid to pass there through. The liner comprises a plurality of cleaning protrusions extending from a cleaning side of the liner. Each cleaning protrusion has a free end spaced apart from another protrusion and adjacent protrusions are configured to move and conform to an area of an object depressed against the liner and brush against and clean the area via the movement An embodiment of the cleaning liner may include a liner substrate comprised of a lower durometer material and the cleaning protrusions comprised of a higher durometer material in relation thereto, a durometer difference thereof configured to allow a depression of the liner substrate by an aggregate force of the protrusions depressed by an object adjacent the liner protrusions. The cleaning protrusions may be disposed on the substrate in areas of successively higher durometers and lower densities enabling a coarse cleaning of the object and disposed on the substrate in areas of successively lower durometers and higher densities enabling a fine cleaning of the object. Other embodiments may comprise a one piece injection molded liner wherein the protrusions and the liner substrate are made of a similar or same durometer material including plastic, silicon and rubber etc and hybrids thereof.

Figure 22B:
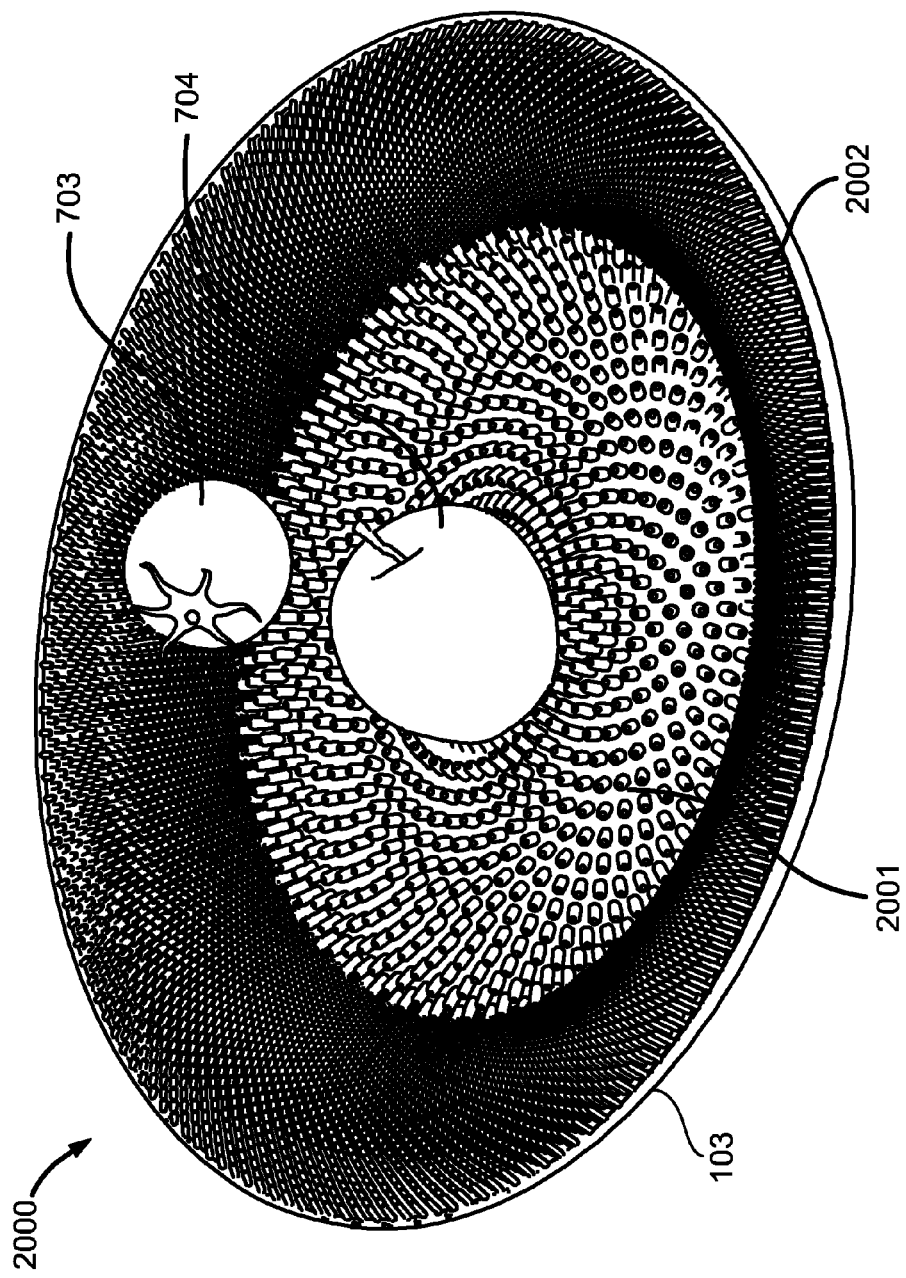
FIG. 22B depicts a brush bowl where various bristles disposed on sides of the bowl move toward objects (depicted solid) depressed against the liner and clean the objects via the movement in accordance with an embodiment of the disclosure.

FIG. 22B depicts a brush bowl where various bristles disposed on sides of the bowl move toward objects (depicted solid) depressed against the liner and clean the objects via the movement in accordance with an embodiment of the disclosure. Reference numbers similar to or the same as reference numbers in other drawings identify similar or same elements as described immediately herein and in other supporting descriptions.

Figure 23A:
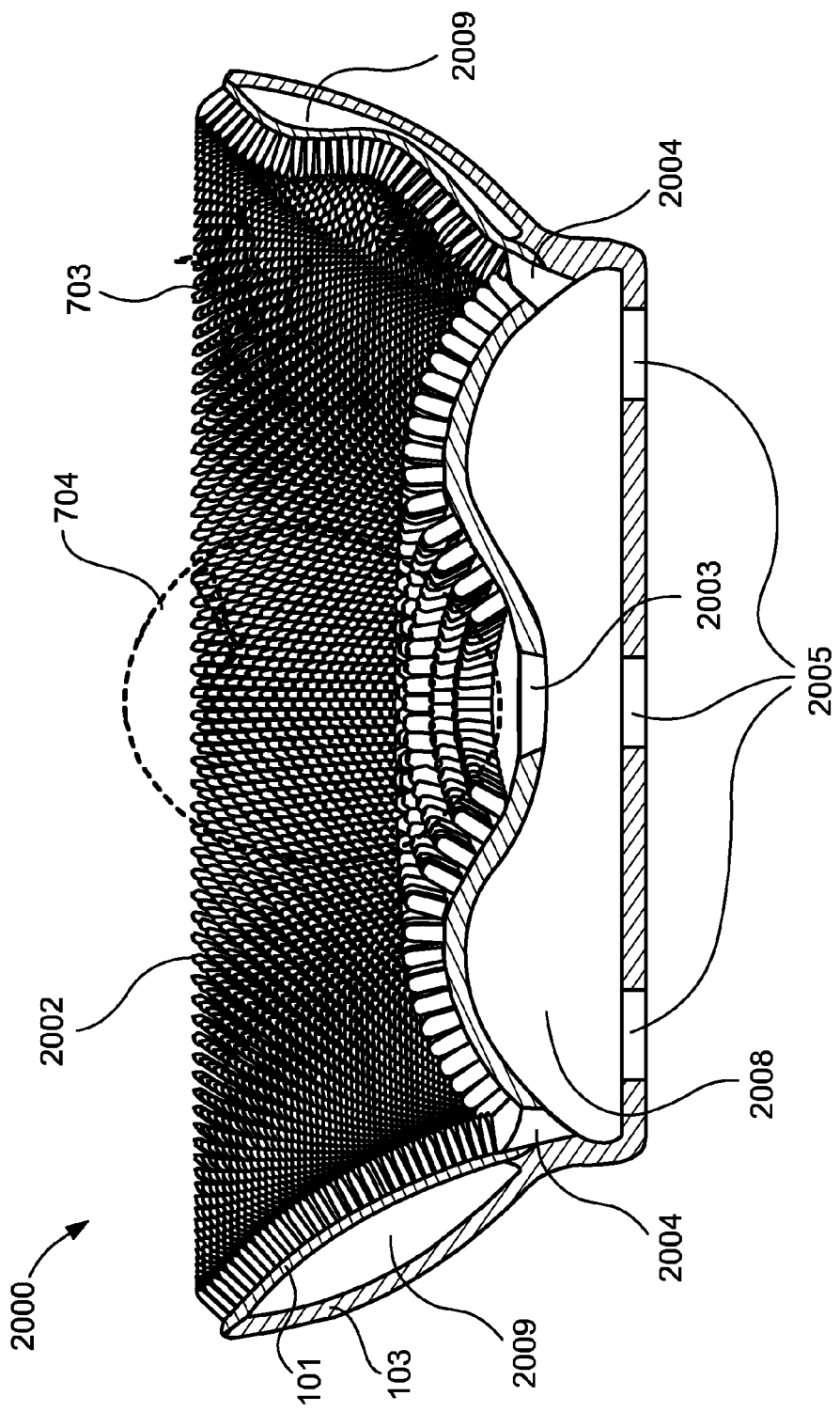
FIG. 23A is a cross-sectional depiction of a brush bowl where various bristles move toward objects (depicted in broken lines) depressed against the liner and clean the objects via the movement in accordance with an embodiment of the present disclosure.

FIG. 23A is a cross-sectional depiction of a brush bowl where various bristles move toward objects (depicted in broken lines) depressed against the liner and clean the objects via the movement in accordance with an embodiment of the present disclosure. The cleaning liner may further comprise a plurality of bumps/apertures 2004 protruding from an underside of the liner opposite the liner cleaning side, the bumps configured to allow the cleaning liner to depress toward the supporting structure and the protrusions to conform to a point of depression thereof and brush against and clean the object thereby. The cleaning liner may also be suspended from the radial supporting structure at least at a perimeter of the supporting structure, the suspension allowing a gap 2009 between the cleaning liner and the support structure, the gap 2009 configured to allow the cleaning protrusions to conform to a point of depression thereof and brush against and clean an object pressed against the liner into the radial supporting structure.

FIG. 23B is a cross-sectional depiction of a brush bowl where various bristles move toward objects (depicted in solid) depressed against the liner and clean the objects via the movement in accordance with an embodiment of the present disclosure. The opening defined in the cleaning liner is configured to pass an egressing cleaning liquid and/or pressurized air/gas in reaction to the object pressed into the liner retained in a supporting structure.

The drawings immediately above combine a few different features: The use of bristles of varying thickness and density (or even material type, such as silicon nubs on the bottom and nylon bristles on the side wall) in conjunction with fruit of differing fragility (apple 704 on the rougher bristles 2001 and tomato 703 on the finer bristles 2002). Also, as illustrated, the bristles may close around the produce as it is pressed into them. This can be described as a benefit in terms of both causing a lateral scraping movement of the bristle tips against the produce skin as well as the possibility that the pinching together of the bristle tips together will act to grip dirt and grime. The gap between the abrasive material and the bowl could potentially be sealed and gas such as ambient air or liquid or gel-filled, or unsealed and unfilled. This may enhance the experience and possibly the action of scrubbing against a pad with gel-like resistance and therefore be more ergonomic and easier on the user's wrists. With the gap between the abrasive interior and the outer bowl walls, drainage apertures may be many narrow channels that conduct from the inner surface to the outer, or one or more larger drainage holes situated in the bottom. In one version, a large, central drainage hole 2003 is added. Also, because the convex shape of the bowl bottom may cause water to pool around the edge of said bottom, drainage holes/bumps 2004 are added around the edge of the supporting structure bowl. Outlets at the sides keep the channels as short as possible but in other embodiments, the outlets could just as easily come out underneath.

Bristles or brushes may all collide together in the very center when it is flexed as illustrated. Conveniently a central drainage hole (can also be a bristle-less surface area that comprises multiple holes) is disposed adjacently. Note the placement of coarse and fine bristles may be the opposite—the fatter bristles on the bottom could be gentle silicone nubs and the bristles on the sides can be coarser (this may work better since produce will by default press against the gentle bristles on the bottom and one can choose whether to rub it against the walls if it is durable enough and needs stronger action to remove dirt).

A method of cleaning a food item is also disclosed. The method may comprise providing a flexible liner defining at least one opening for a fluid to pass there through, the liner comprising a plurality of cleaning protrusions extending from a cleaning side of the liner, the cleaning protrusions having a free end spaced adjacent another protrusion, the protrusions configured to conform to an object depressed against the liner. The method may also comprise applying a cleaning fluid to the object and/or to the cleaning liner. The method may additionally comprise pressing the food item against the cleaning liner allowing the cleaning protrusions to move toward a point of depression thereof and toward each other and brush against and clean the object thereby. An embodiment of the method of cleaning a food item may further comprise spinning the liner about a central axis of a radial supporting structure. Another embodiment of the method of cleaning a food item may comprise evacuating the cleaning fluid from the liner via an alignment of the liner opening and an opening defined in a supporting structure.

In an embodiment of the disclosure, a center of the separable liner is able to flex down (with the apple pressing in), the aperture channel below may also flex, depicted as a slight bulging in FIG. 23B. This liner can still be removable (the edges of the drainage tube could be part of the liner as depicted, or simply defined by the gel that would fill cavity 2010). Alternatively, the bowl bottom itself could flex under pressure from above (it could have a rigid rim around the edge that descends down to provide some clearance above a counter top to allow the bowl bottom to flex). In other words, the whole bowl may be made of a flexible silicon, without the need for a separable cleaning liner.

In an embodiment, the open cavity 2008 between the liner and the bowl floor may allow the passage of water and is not sealed (i.e. the bowl floor and the liner have apertures that don't need to be connected by tubes like 2007). This is illustrated in FIG. 23A. Since the bowl floor now has holes 2005 in it, the edge apertures/bumps 2004 in the liner drain directly into the floor below, rather than out the sides (as with 2006 in FIG. 23B). Clogging shouldn't be an issue and the liner can be removed to clear out any residue caught in the bowl below.

In another embodiment of the disclosure, the disclosed device and method may be used in drying of fruit and vegetables (and potentially other products). By holding produce up on many small bristle-tips, a greater amount of surface area underneath the fruit is exposed to the air and the bowl will therefore improve drying times. This is especially the case where the bristles are interspersed with drainage holes, which will help to move more air underneath the fruit. In other words, a gas such as air may be circulated around and between the food item and the protrusions from at least the one liner opening to at least an additional liner opening in order to dry and dehydrate the food item.

In another embodiment, the disclosed device and method may be used in the storage of fruit and vegetables. Fruit that sits against a hard surface or other adjacent fruit is very prone to rotting from the pressure against it. It is easy to not notice rot that starts to appear underneath a fruit because it is not visible and when fruit are pressed together in close quarters one rotting fruit quickly spreads its rot or mold to others around it (hence the age-old expression related to a "bad apple" having a negative influence on others around him or her). By placing a delicate and perishable food item such as fruit into the disclosed brush bowl device, the bristles, protrusions or nubs help distribute a weight of the food item and thereby help prevent rot from setting in by: a) allowing adequate air flow underneath, and b) even distribution of the load so that the fruit is not all pressing down on one point. This is particularly the case if the bristled surface is able to "give" or deform/conform around the fruit (as illustrated in FIGS. 22A and B and 23A and B).

Other embodiments of the disclosure allow keeping fruit separated (especially if the bristled surface can have multiple indentation points, with some kind of intermittent structural support underneath that directs the dips to occur in predetermined, separate positions) in the retaining bowl or supporting structure in separate depressions. For example, a tray that is coated inside with or comprises bristles, protrusions or nubs as disclosed may have rows of indentations or undulations into which each fruit will naturally sit and be separated from adjacent fruit (not unlike the Styrofoam™ or plastic trays that many fruit like apples are sold in—in terms of shape, but not surface composition). This could be a stackable rack for space saving, and could have an attractive design or perimeter shape to make it less industrial-looking. The Tray could fit into or be part of a container that can fit in a fridge shelf and be sealable with a lid (and also underneath).

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Notwithstanding specific embodiments of the invention have been described and illustrated, the invention is not to be limited to the specific forms or arrangements of parts so described and illustrated. The scope of the invention is defined by the claims and their equivalents herein.

What is claimed is:

1. A cleaning device, comprising:
 a supporting structure configured to retain a food item, the supporting structure substantially radial, the supporting structure defining at least one opening for a fluid to pass there through;
 a flexible liner retainable in the supporting structure, the liner having a cleaning side and an inward side facing the supporting structure, the liner configured to define at least one opening for a fluid to pass there through, the liner comprising a plurality of cleaning protrusions extending from the cleaning side of the liner, each cleaning protrusion having a free end spaced apart from another protrusion and adjacent protrusions configured to move in conformance to an area of an object depressed against the cleaning side of the line; and a gap defined between the inward side of the liner and the supporting structure, the gap configured to allow the inward side of the liner to move toward the supporting structure in conformance to the area of the object depressed against the cleaning side of the liner and allow the cleaning protrusions to brush against and clean the area of the object depressed against the cleaning side of the liner.

2. The cleaning device of claim 1, wherein the at least one opening defined in the liner is configured to pass an egressing cleaning liquid and/or a pressurized air/gas in reaction to the object pressed into the liner.

3. The cleaning device of claim 1, wherein the supporting structure is a retaining bowl, wherein a perimeter of the bowl comprises a circular shape, an oblong shape, an oval shape and any other common bowl shape.

4. The cleaning device of claim 1, wherein the supporting structure is a ring, wherein the ring is at least one of integrated with a retaining structure and separable from the retaining structure.

5. The cleaning device of claim 1, wherein the radial supporting structure is a celery scrubber ring comprising a central scrubbing protrusion configured to scrub a trench inside a celery stick.

6. The cleaning device of claim 1, wherein the at least one opening defined in the liner is at least partially occluded by the radial supporting structure, a relation of the liner to the radial supporting structure adjustable to allow also a full occlusion of the liner opening by the supporting structure.

7. The cleaning device of claim 1, wherein the cleaning protrusions comprise bristles, fibers, and silicone nubs.

8. The cleaning device of claim 1, wherein the cleaning protrusions are one of affixed into and onto the liner and emanate from the liner and the cleaning protrusions emanate directly from the supporting structure and comprise a substantially similar durometer material to the liner substrate.

9. The cleaning device of claim 1, wherein the cleaning protrusions are disposed on the liner in areas of successively higher durometers and lower densities enabling a coarse cleaning of the object and areas of successively lower durometers and higher densities enabling a fine cleaning of the object.

10. The cleaning device of claim 1, wherein the liner comprises a lower durometer material and the cleaning protrusions comprise a higher durometer material in relation thereto, a durometer difference configured to allow a depression of the liner by an aggregate force of the protrusions depressed by an object adjacent thereof.

11. The cleaning device of claim 1, further comprising a plurality of bumps protruding between an underside of the liner and the supporting structure, the bumps configured to allow the liner to depress toward the supporting structure and the protrusions to conform to a point of depression thereof and brush against and clean the object thereby.

12. The cleaning device of claim 1, wherein the supporting structure is a retaining bowl comprising a removable bottom, the removable bottom configured to retain a separable bottom portion of the liner attached thereto.

13. The cleaning device of claim 1, wherein the supporting structure further comprises extendable arms configured to extend beyond a width of a conventional kitchen sink and suspend the cleaning device above a surface of the sink.

14. The cleaning device of claim 1, wherein the supporting structure further comprises retractable legs configured to fold-up to allow compact storage of the device, the legs also configured to suspend the cleaning device above a surface during use and to secure the cleaning device on a side during storage.

\* \* \* \* \*